United States Patent
Hinman et al.

(10) Patent No.: US 8,618,456 B2
(45) Date of Patent: Dec. 31, 2013

(54) INVERTER FOR A THREE-PHASE AC PHOTOVOLTAIC SYSTEM

(75) Inventors: Brian Hinman, Los Gatos, CA (US); Hossein Kazemi, San Francisco, CA (US); Wayne Miller, Los Altos, CA (US)

(73) Assignee: Western Gas and Electric Company, Thousand Oaks, CA (US)

( * ) Notice: Subject to any disclaimer, the term of this patent is extended or adjusted under 35 U.S.C. 154(b) by 359 days.

(21) Appl. No.: 13/028,122

(22) Filed: Feb. 15, 2011

(65) Prior Publication Data

US 2011/0198935 A1 Aug. 18, 2011

Related U.S. Application Data

(60) Provisional application No. 61/338,313, filed on Feb. 16, 2010, provisional application No. 61/424,537, filed on Dec. 17, 2010, provisional application No. 61/343,070, filed on Apr. 23, 2010.

(51) Int. Cl.
*G01J 1/44* (2006.01)

(52) U.S. Cl.
USPC .............................. 250/203.4; 307/45; 363/71

(58) Field of Classification Search
USPC .......... 250/203.4; 363/16, 40, 55, 71; 307/45, 307/52, 77, 82; 136/243–244
See application file for complete search history.

(56) References Cited

U.S. PATENT DOCUMENTS

| | | | |
|---|---|---|---|
| 3,721,862 A | 3/1973 | Brennen et al. | |
| 6,111,732 A | 8/2000 | Beland | |
| 6,404,655 B1 * | 6/2002 | Welches | 363/41 |
| 6,856,497 B2 | 2/2005 | Suzui et al. | |
| 6,914,418 B2 * | 7/2005 | Sung | 320/140 |
| 6,930,868 B2 | 8/2005 | Kondo et al. | |
| 7,053,506 B2 * | 5/2006 | Alonso et al. | 307/126 |
| 7,456,524 B2 * | 11/2008 | Nielsen et al. | 307/82 |
| 7,561,017 B2 | 7/2009 | Darr et al. | |
| 2002/0105765 A1 | 8/2002 | Kondo et al. | |
| 2003/0067723 A1 | 4/2003 | Suzui et al. | |
| 2004/0026929 A1 | 2/2004 | Rebsdorf et al. | |
| 2004/0211459 A1 | 10/2004 | Suenaga et al. | |
| 2005/0121067 A1 | 6/2005 | Toyomura et al. | |
| 2007/0034246 A1 | 2/2007 | Nakata | |
| 2007/0189045 A1 | 8/2007 | Gritter | |
| 2008/0238195 A1 | 10/2008 | Shaver et al. | |
| 2008/0285317 A1 | 11/2008 | Rotzoll | |

(Continued)

FOREIGN PATENT DOCUMENTS

WO WO 2011/133244 10/2011
WO WO 2011/133245 10/2011

OTHER PUBLICATIONS

International Search Report and Written Opinion for PCT/US2011/25339, dated Apr. 22, 2011, 9 pages, International Searching Authority/US, Alexandria, VA. USA.

International Preliminary Report on Patentability for PCT/US2011/25339, dated Oct. 23, 2012, 8 pages, The International Bureau of WIPO, Geneva, Switzerland.

(Continued)

*Primary Examiner* — Seung C. Sohn
(74) *Attorney, Agent, or Firm* — Rutan & Tucker, LLP

(57) ABSTRACT

Various methods and apparatus are described for a photovoltaic system. In an embodiment, pluralities of three-phase Alternating Current (AC) inverter circuits electrically connect into a common three phase AC output. Each of those inverters receives a bipolar DC voltage supplied from its own set of Concentrated PhotoVoltaic (CPV) modules.

19 Claims, 16 Drawing Sheets

(56) References Cited

U.S. PATENT DOCUMENTS

| | | |
|---|---|---|
| 2009/0021014 A1 | 1/2009 | Letas |
| 2009/0032082 A1 | 2/2009 | Gilmore et al. |
| 2009/0086396 A1 | 4/2009 | Bax et al. |
| 2009/0190275 A1 | 7/2009 | Gilmore et al. |
| 2009/0196082 A1 | 8/2009 | Mazumder et al. |
| 2009/0244936 A1 | 10/2009 | Falk et al. |
| 2009/0283130 A1 | 11/2009 | Gilmore et al. |
| 2009/0315404 A1 | 12/2009 | Cramer et al. |
| 2010/0018135 A1 | 1/2010 | Croft et al. |
| 2010/0025995 A1 | 2/2010 | Lang et al. |
| 2010/0071742 A1 | 3/2010 | De Rooij et al. |
| 2010/0084924 A1 | 4/2010 | Frolov et al. |
| 2010/0085670 A1 | 4/2010 | Palaniswami et al. |
| 2010/0103569 A1 | 4/2010 | Ward |
| 2010/0110742 A1 | 5/2010 | West |
| 2010/0141041 A1 | 6/2010 | Bose et al. |
| 2010/0195361 A1 | 8/2010 | Stem |
| 2010/0246230 A1 | 9/2010 | Porter et al. |
| 2010/0253151 A1 | 10/2010 | Gerhardinger et al. |
| 2010/0282293 A1 | 11/2010 | Meyer et al. |
| 2011/0057444 A1 | 3/2011 | Dai et al. |
| 2011/0198935 A1 | 8/2011 | Hinman et al. |

OTHER PUBLICATIONS

Walker, G.R. et al., "PV String Per-Module Maximum Power Point Enabling Converters," School of Information Technology and Electrical Engineering, The University of Queensland, Conference, 2003, Retrieved on Apr. 11, 2011, 6 pages.

Final Office Action for U.S. Appl. No. 13/028,152 mailed Feb. 21, 2013, 25 pages. U.S. Patent and Trademark Office, Alexandria, VA. USA.

Non-Final Office Action for U.S. Appl. No. 13/028,152 mailed Oct. 18, 2012, 27 pages. U.S. Patent and Trademark Office, Alexandria, VA. USA.

Notice of Allowance for U.S. Appl. No. 13/028,152, filed Jun. 20, 2013, 19 pages. U.S. Patent and Trademark Office, Alexandria, VA. USA.

International Search Report and Written Opinion for International Application No. PCT/US2011/25337, dated May 26, 2011, 11 pages. International Searching Authority/US, Alexandria, VA. USA.

International Preliminary Report on Patentability for International Application No. PCT/US2011/25337, dated Oct. 23, 2012, 8 pages. International Bureau of WIPO, Geneva, Switzerland.

* cited by examiner

FIG 3   Representative Tracker Arrangement

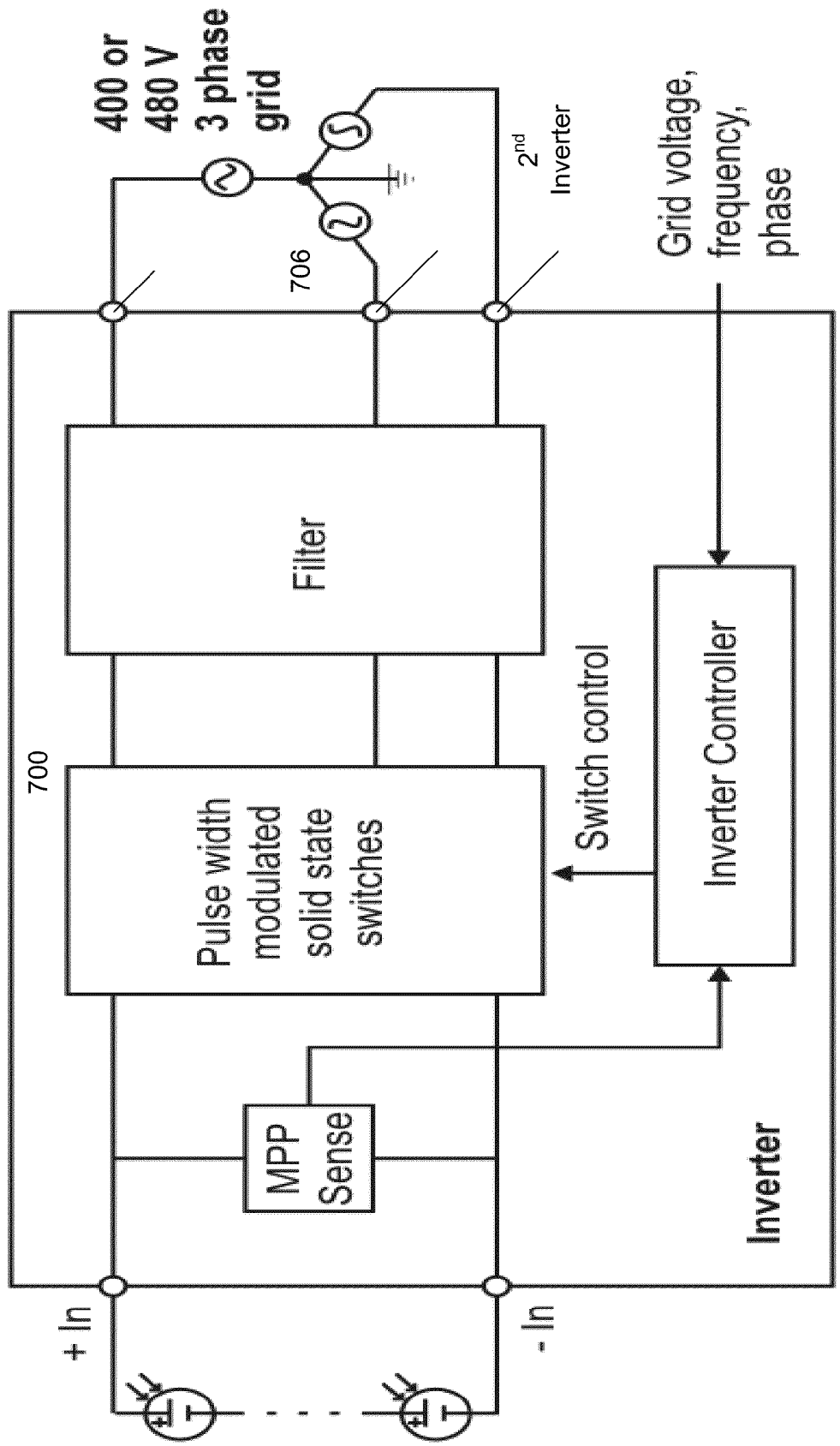
FIG 7        DC-to-Three Phase Inversion

INVERTER FOR A THREE-PHASE AC PHOTOVOLTAIC SYSTEM

RELATED APPLICATIONS

This application is a continuation in part of the following and claims the benefit of and priority under 35 USC 119(e) to U.S. Provisional Application titled "SINGLE STAGE DC-TO-AC CONVERSION FOR HIGH EFFICIENCY OPERATION OF CONCENTRATING PHOTOVOLTAIC SYSTEMS" filed on Feb. 16, 2010 having application Ser. No. 61/338,313 and U.S. Provisional Application titled "INTEGRATED ELECTRONICS SYSTEM" filed on Dec. 17, 2010 having application Ser. No. 61/424,537, and U.S. Provisional Application titled "SOLAR CELL SUBSTRING GROUNDING TO MANAGE INVERTER INPUT VOLTAGE" filed on Apr. 23, 2010 having application Ser. No. 61/343,070.

NOTICE OF COPYRIGHT

A portion of the disclosure of this patent document contains material that is subject to copyright protection. The copyright owner has no objection to the facsimile reproduction by anyone of the interconnect as it appears in the Patent and Trademark Office Patent file or records, but otherwise reserves all copyright rights whatsoever.

FIELD

In general, a photovoltaic system having a three phase inverter is discussed.

BACKGROUND

Two methods have been used in the past to convert DC for a solar array in AC voltage. A DC-DC boost converter can be used to increase the string voltage enough for a sine-triangle PWM inversion. Alternatively, a transformer can be used after the inverter circuit to step up the inverter output. Either solution adds cost and reduces efficiency and reliability.

SUMMARY

Various methods and apparatus are described for a photovoltaic system. In an embodiment, a plurality of three-phase Alternating Current (AC) inverter circuits electrically connects into a common three phase AC output. Each of those inverters receives a bipolar DC voltage supplied from its own set of Concentrated PhotoVoltaic (CPV) modules.

BRIEF DESCRIPTION OF THE DRAWINGS

The multiple drawings refer to the embodiments of the invention.

FIG. 7 shows a diagram of an embodiment of a single stage inverter circuit that converts the input DC voltage level directly to the output AC voltage level for high efficiency operation of the concentrating photovoltaic electrical power generation system.

Figure 1:
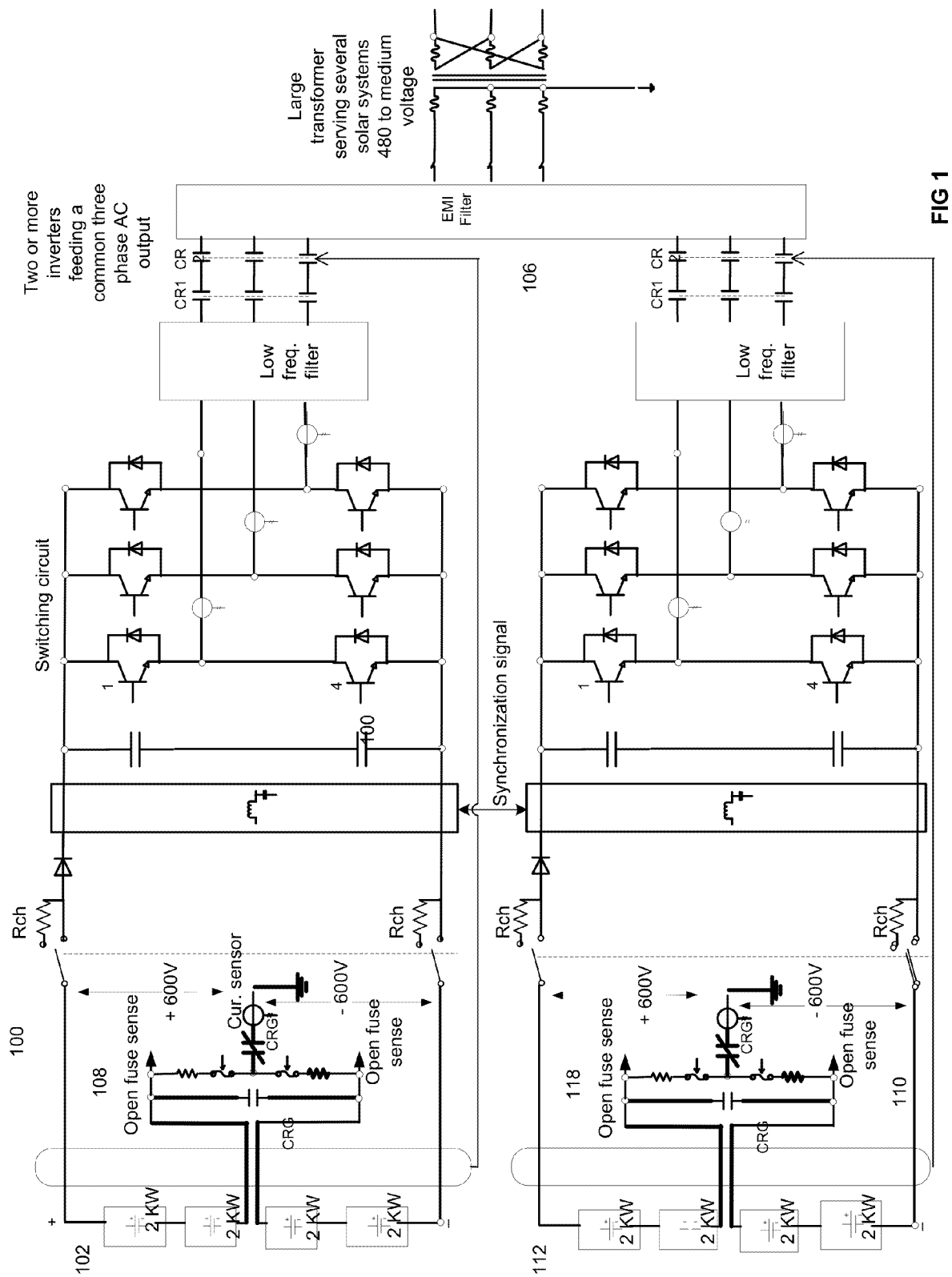
FIG. 1 illustrates a diagram of an embodiment of a multiplicity of a three phase Alternating Current (AC) inverters electrically connecting into a common three phase AC output, where each inverter receives a bipolar DC voltage supplied from its own set of Concentrated PhotoVoltaic (CPV) modules.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific voltages, named components, connections, types of circuits, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Further specific numeric references such as a first inverter, may be made. However, the specific numeric reference should not be interpreted as a literal sequential order but rather interpreted that the first inverter is different than a second inverter. Thus, the specific details set forth are merely exemplary. The specific details may be varied from and still be contemplated to be within the spirit and scope of the present invention. The specific details may be varied from and still be contemplated to be within the spirit and scope of the present invention.

In general, various methods and apparatus associated with an inverter for a photovoltaic system are discussed. In an embodiment, a first bipolar DC voltage is supplied from a first set of CPV modules in the solar array to a first three-phase AC inverter circuit. A second bipolar DC voltage is supplied from a second set of CPV modules in the solar array to a second three-phase AC inverter circuit. Then, the AC output of the first and second three-phase AC inverter circuits combine into a common three phase AC output, which is supplied to the Utility Power grid. The first and second bipolar DC input voltage levels from the sets of CPV modules may be supplied at a high enough level to directly convert this DC input voltage level to an AC working voltage level coming out of the three-phase AC inverter circuits. One or more strings of CPV cells all from the East side of a solar array may feed into the first three-phase AC inverter circuit. Likewise, one or more strings of CPV cells all from the West side of the solar array may feed into the second inverter circuit.

FIG. 1 illustrates a diagram of an embodiment of a multiplicity of a three phase Alternating Current (AC) inverters electrically connecting into a common three phase AC output, where each inverter receives a bipolar DC voltage supplied from its own set of Concentrated PhotoVoltaic (CPV) modules. Each inverter of the multiple inverters 100, 110 for this solar array receives power from the CPV modules 102, 112 and supplies power to a common AC output 106. A first string of CPV cells 102 on the East side of a solar array feeds a first inverter 100. A second string of CPV cells 112 on the West side of the solar array feeds a second inverter 112.

An input DC grounding circuit 108, 118 located in each inverter circuit 100, 110 that electrically couples to the strings of CPV cells from the solar array. The electrical components in the input DC grounding circuit 108, 118 cause the DC power from that strings of CPV cells to be connected to ground when the inverter circuit 100, 110 is not producing three phase AC power out and the electrical components in the input DC grounding circuit 108, 118 also use 1) a contact 2) switch or 3) both to create a dynamic ground/common zero VDC reference point for the bipolar DC voltage supplied to that inverter 100, 110 from its set of CPV modules 102, 112. For example, the first input DC grounding circuit 108 uses a normally open contact to create a dynamic ground/common zero VDC reference point for the +/−bipolar 600 VDC input voltage from the solar array. The left CRG normally open contact in the first input DC grounding circuit 108 closes when the inverter is ready to receive the DC input voltage and generate an AC output voltage to the utility power grid. The right CRG normally closed contact is closed when the inverter 100 is not producing AC power out and thus grounds the DC input voltage from the arrays. The two or more inverter circuits 100, 110 then feed a common three-phase AC output 106. The DC voltage output of the solar cell array is converted to 3-phase AC grid power using the two or more single-stage inverters feeding that common AC output 106.

Enough CPV cells are connected electrically in series in a string of CPV cells to allow the bipolar DC voltage from the CPV modules to allow the DC input voltage level from the CPV string of cells to be high enough to directly convert the DC voltage to the working AC voltage level but lower than the maximum DC voltage limit set by the National Electric Code, such as +/−600 VDC. The absolute voltage level supplied can range from 700-1200 VDC. The DC voltage level from the solar arrays is high enough to convert to the working AC voltage level such as 480 while avoiding the need for a DC boost stage. For each string of CPV cells feeding an inverter, a dynamic common reference point circuit creates a 0 volts DC reference point between paddles.

A multiplicity of multiple junction solar cells, including GaAs cells, are strung together such that its highest end-to-end voltage (unloaded, cold cells) is at least 700 VDC, but not in excess of, 1200 VDC at least when they supply voltage to the inverters. For compliance with the +/−600 V-to-ground safety limit, the midpoint of the string is connected to utility ground via a normally closed relay contact while the inverter is off, this creating a +/−600 V bipolar string.

Figure 2:
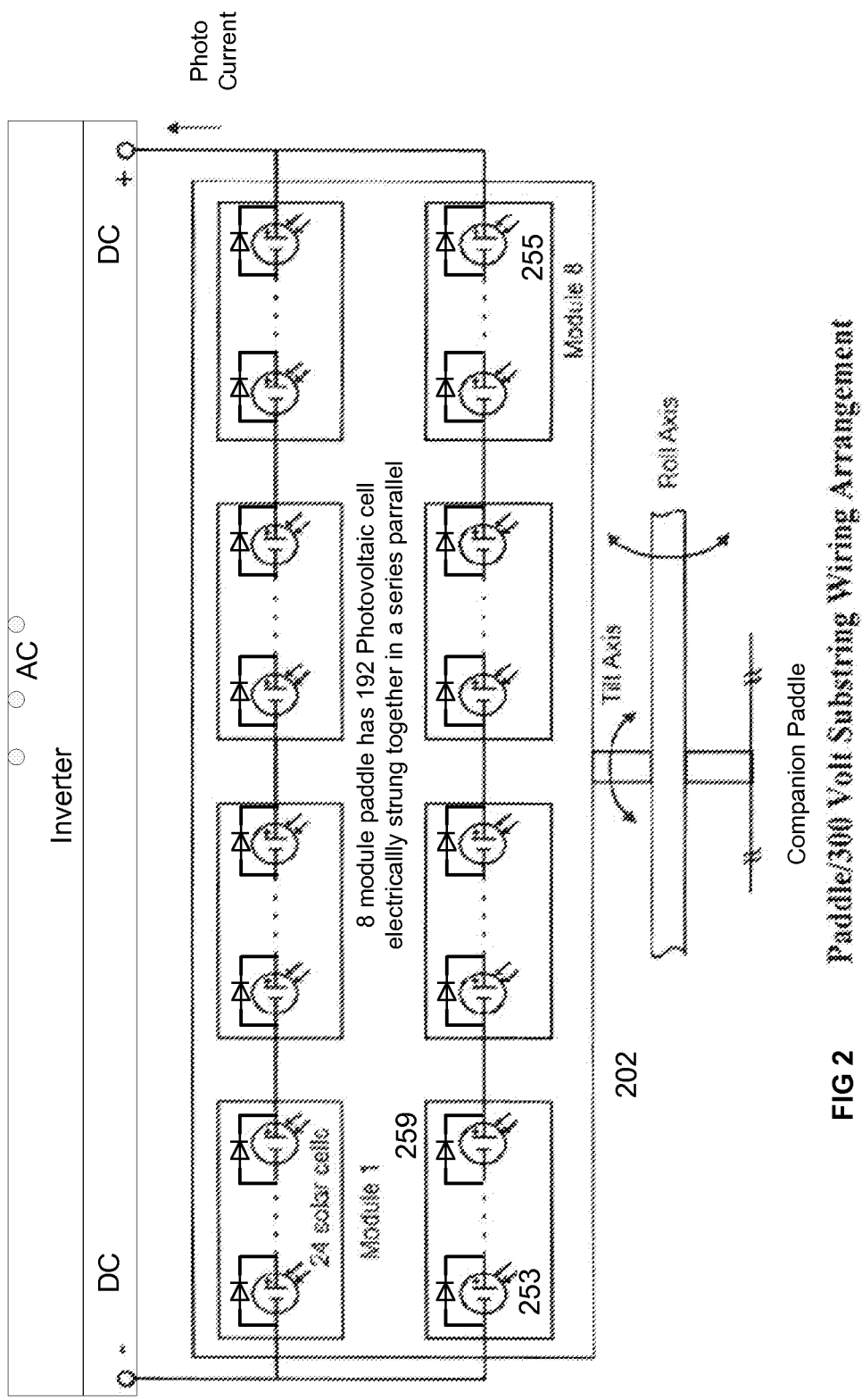
FIG. 2 illustrates a diagram of an embodiment of an inverter circuitry receiving the DC voltage generated by the CPV cells and is specifically designed to handle an input voltage range anticipated from the fixed number of photovoltaic cells.

FIG. 2 illustrates a diagram of an embodiment of an inverter circuitry receiving the DC voltage generated by the CPV cells and is specifically designed to handle an input voltage range anticipated from the fixed number of photovoltaic cells, such as 192 cells. Each paddle 202 of the solar array may contain a set of CPV modules that have a fixed number of CPV cells to establish a roughly fixed range of operating voltage for the inverter. For example, it may be 8 module assemblies, in which each CPV module contains 24 individual concentrated photovoltaic cells. The ideal method of utilizing the DC output of a solar cell array is to wire enough cells in series to produce a DC voltage that is high enough to directly invert to the grid power form (480V 3 phase in the US, 400V 3 phase in the EU). This assists in eliminating the need for a DC-DC boost converter stage preceding the inverter or a voltage step-up transformer following the inverter to convert the DC to the proper AC amount. The three-phase AC inverter circuitry has no need for supplemental input DC voltage level boosting strategies, including a DC input boost stage to increase the DC input voltage level to a higher DC voltage level for the DC to AC conversion, because the supplied bipolar DC input voltage level from the set of CPV modules is high enough to directly convert to the AC working voltage level, and provides a three-phase 480 VAC output voltage level from the inverter circuit without the DC input boost stage or a step up transformer after the inverter portion. In Europe, the inverters put out the standard 400 VAC. Overall, the output of the solar cell array is converted to a 3-phase grid power using these two or more single-stage inverters.

Figure 3:
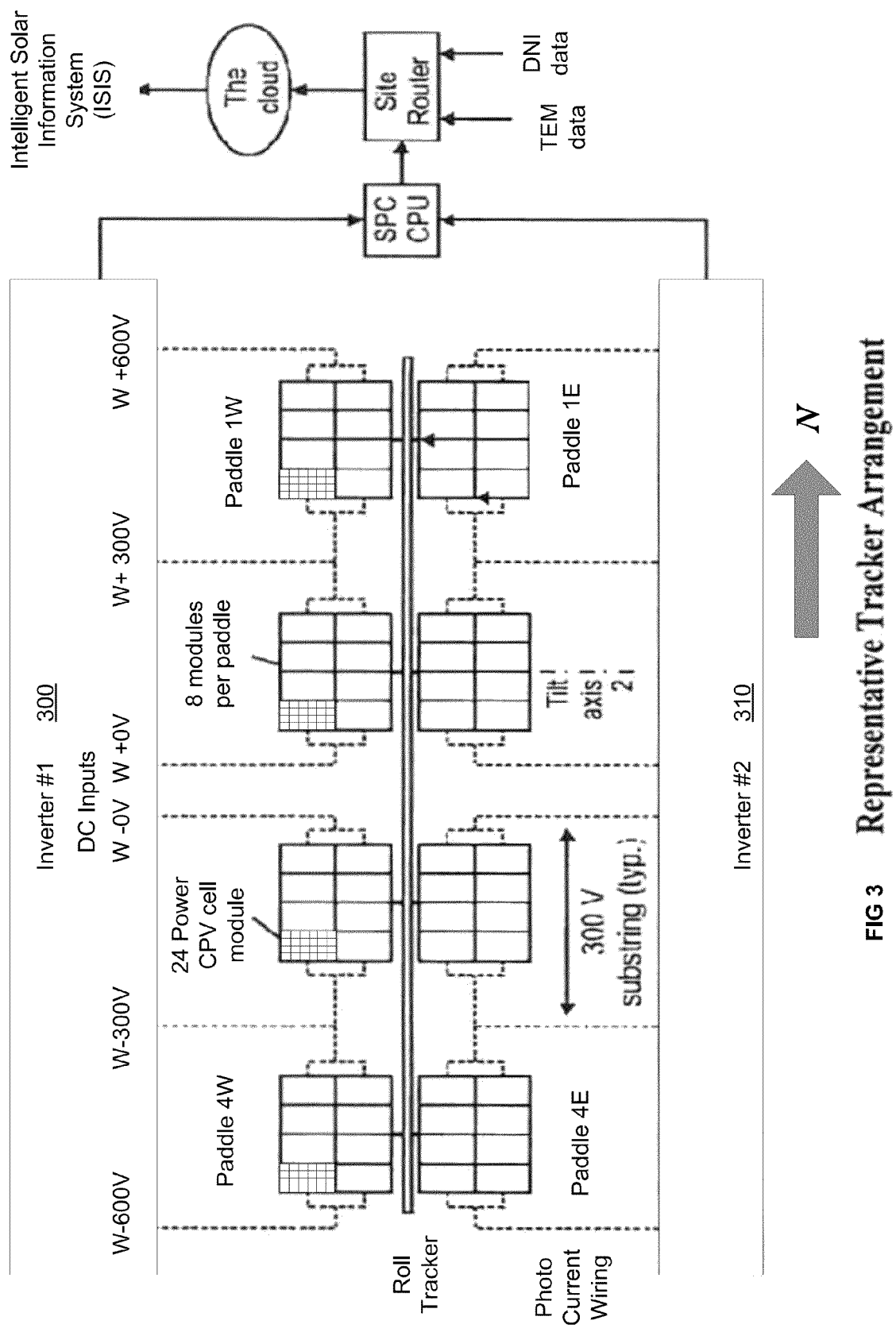
FIG. 3 shows a diagram of an embodiment of the physical and electrical arrangement of modules in a representative solar array tracker unit.

Each three phase AC Inverter circuit may have multiple, such as two, MPPT strings per solar array operating over a wide temperature range (see for example FIG. 3). The solar array with multiple CPV modules may be organized with one or more strings of CPV cells arranged in an electrically series arrangement. There may be several such strings of CPV cells per solar array. In alternative designs, a given string of CPV cells may span two or more such solar arrays.

Figure 4:
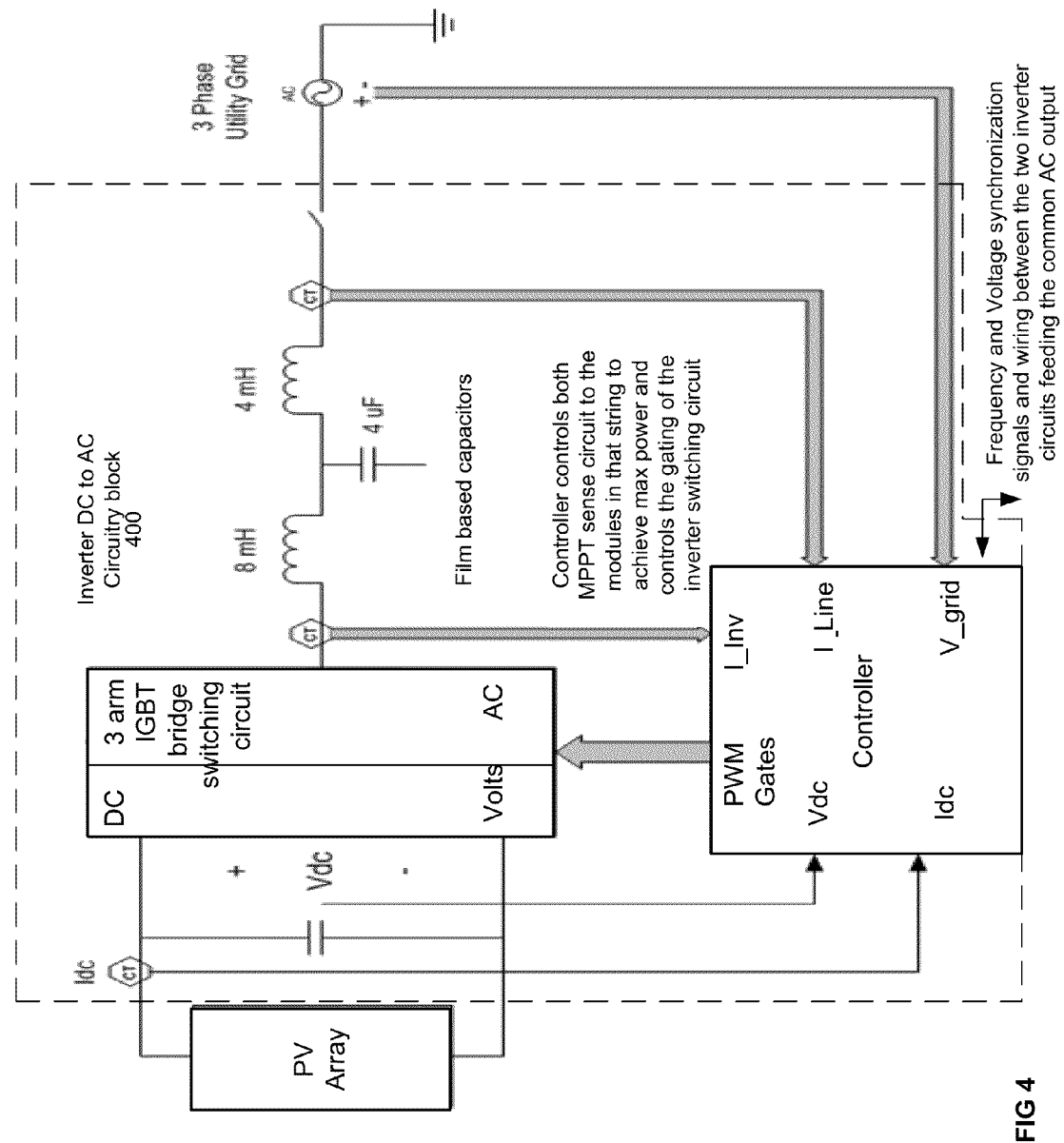
FIG. 4 illustrates a diagram of an embodiment of a single stage DC-to-AC voltage inverter conversion circuitry without a DC boost stage or step up transformer for a highly efficient operation of this concentrating photovoltaic electrical power generation system.

FIG. 4 illustrates a diagram of an embodiment of a single stage DC-to-AC voltage inverter conversion circuitry without a DC boost stage or step up transformer for a highly efficiency operation of this concentrating photovoltaic electrical power generation system. The single stage DC-to-AC voltage conversion circuitry contains the plurality of three phase AC inverter circuits, including the first inverter circuit 400, electrically connecting into the common three-phase AC output. The bi-polar voltage modules from the paddle put out enough DC voltage to do an AC conversion to a working AC voltage level, such as 480 Volts AC, without these supplemental input DC voltage boosting strategies including the DC: DC boost stage circuitry and boost transformer.

FIG. 3 shows a diagram of an embodiment of the physical and electrical arrangement of modules in a representative solar array tracker unit. In this example configuration there are 24 concentrated solar photovoltaic cells per module, eight modules per paddle, two paddles per tilt axis, and four independently-controlled tilt axes per common roll axis. As discussed, the bi-polar voltage from the set of CPV modules in the solar array, may be, for example, a +600 VDC and a −600 VDC making a 1200 VDC output coming from the 16 PV modules. The 16 PV module array may be a string of PV cells arranged in an electrically series arrangement of two 300 VDC sets of CPV modules adding together to make the +600 VDC, along with two 300 VDC sets of CPV modules electrically adding together to make the −600 VDC. The supplied total of 1200 VDC is eventually converted in the first inverter 300 to three-phase 480 VAC. Likewise, a supplied total of 1200 VDC is eventually converted in the second inverter 310 to three-phase 480 VAC. Thus, the bi-polar CPV set of modules drive a multiplicity of three phase inverters. In this case, partitioning the solar cells into 300 V substrings is done for power management to ensure the maximum DC voltage level supplied to the inverter. Also, the inverters 300 and 310 can put out the rated 480 VAC with an input from the string of CPV cells as low as roughly 700 VDC total and up to the maximum input of 1200 VDC total.

In contrast to typical inverters that couple to solar modules from both the East and West sides of the tracker and are forced to operate with the lower input voltage between the two, in the current implementation each of the multiple inverters 300, 310 may couple to the CPV modules from all one side. Each of the solar arrays in the three phase AC photovoltaic system uses two or more three phase AC inverters per solar array. The solar array has CPV cells on the East and West side of the solar array contained in the CPV modules supplying the bipolar DC voltage to the plurality of three-phase AC inverters 300, 310. The two or more three-phase AC inverters 300, 310 per this single solar array account for voltage differences coming out of the set of CPV modules on the East side of the solar array and the voltage coming out of the set of CPV modules on the West side of the solar array. This allows a first three phase AC inverter 300 connected to the set of CPV modules on the East side to operate at the bipolar DC input voltage level coming from the East side independent of what bipolar DC input voltage level is being produced and supplied by the set of CPV modules on the West side to a second three phase AC inverter 310, and vice versa. (See FIG. 5 for example as well).

FIGS. 6a-6h illustrate the grouping of similarly shaded modules into the same string of CPV cells feeding a particular inverter. The modules aligned on the East side of the paddle pairs should all experience roughly the same illumination/shading conditions. The same goes for modules aligned on the West side of the paddle pairs should all experience roughly the same illumination/shading conditions.

Referring back to FIG. 3, the solar array has CPV cells on the East and West side of the solar array contained in the CPV modules supplying the bipolar DC voltage to the two or more three-phase AC inverters 300, 310. Each inverter 300, 310 has its own MPPT sense circuit per string of CPV cells electrically coupling to that inverter to maximize the DC power coming from the string of CPV cells. For example, a first MPPT sense circuit maximizes the DC power coming from a first string of CPV cells located exclusively on the East side of the solar array, and a second MPPT sense circuit maximizes the DC power coming from a second string of CPV cells located exclusively on the West side of the solar array. One or more Maximum Power Point Tracking sense circuits, such as two, are associated with each three phase AC inverter circuit 300, 310. In an embodiment, two or more strings of CPV cells from the solar array are fed into their respective inverter 300, 310.

FIGS. 6a-6g illustrate the example shading effects on an embodiment of the CPV modules of the solar arrays from Sunrise (dawn) to Sunset and at the various angles of the Sun in between Sunrise to Sunset. Individual strings of CPV cells coupling to the inverters may be arranged in such a way to operate within the constraint that a given string of CPV cells may dropout from producing sufficient voltage to the inverters to generate the three phase AC working voltage level of 480 VAC due to early morning and late evening shading. The grouping of similarly shaded modules into the same string of CPV cells feeding a particular inverter tends to allow a more narrow input working voltage into that inverter which helps to avoid a DC-to-DC boost stage requirement between the input DC voltage circuit and the AC conversion portion in that inverter. Generally, in the exclusive grouping of 1) modules on the East side or 2) modules on the West side major shading issues commonly occur across all of the modules containing the string of CPV cells supplying DC voltage into that particular inverter. Thus, when Sun is directly shinning on all the modules in that horizontal row making up a string, then the input DC voltage may be 1000 VDC and when the angle of the Sun changes throughout the day to fully shade the horizontal row of modules making up a string, then the input DC voltage dramatically drops less than 200 VDC.

Figure 6A:
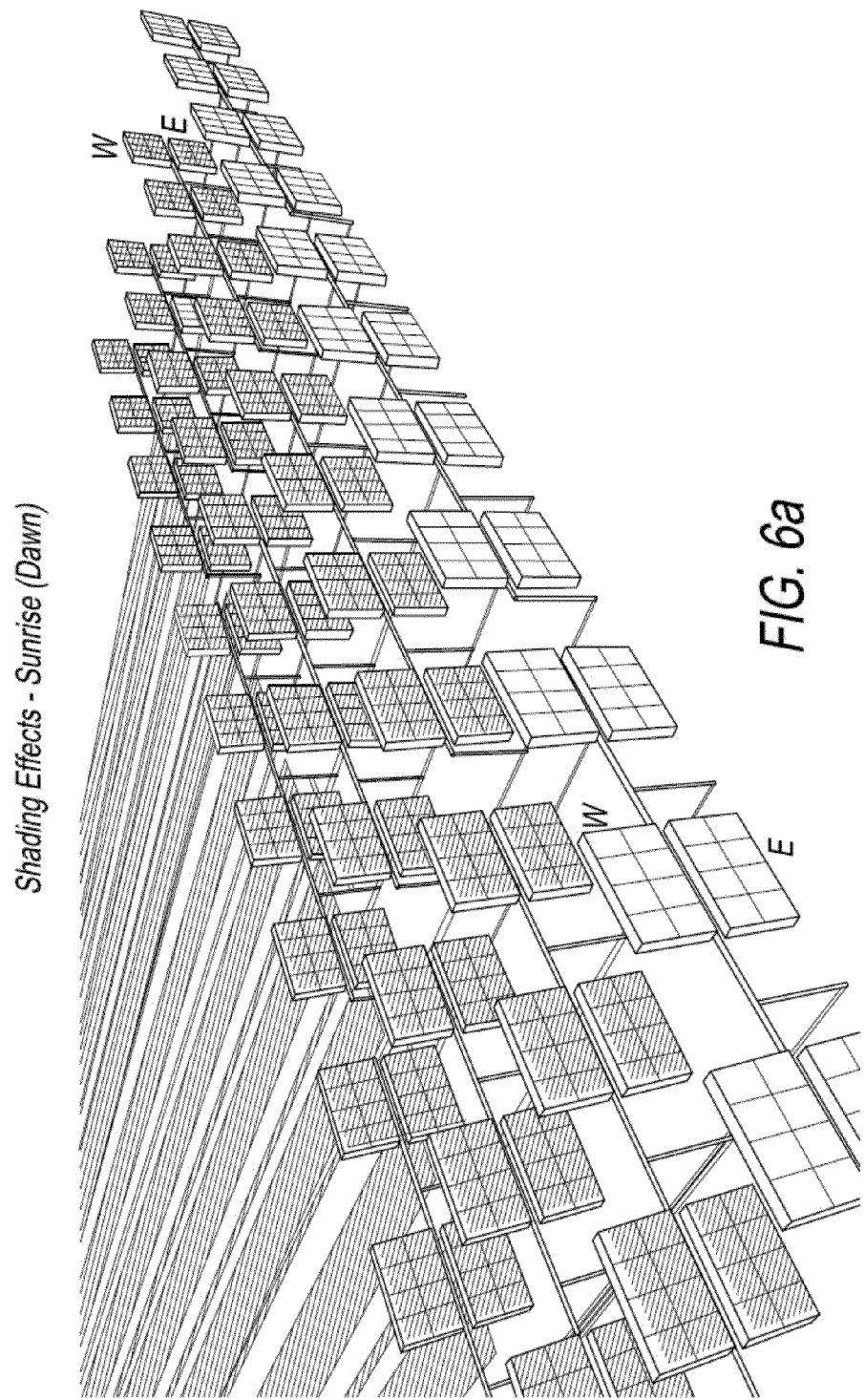
FIGS. 6a-6g illustrate the example shading effects on an embodiment of the CPV modules of the solar arrays from Sunrise (dawn) to Sunset and at the various angles of the Sun in between Sunrise to Sunset.
Figure 6B:
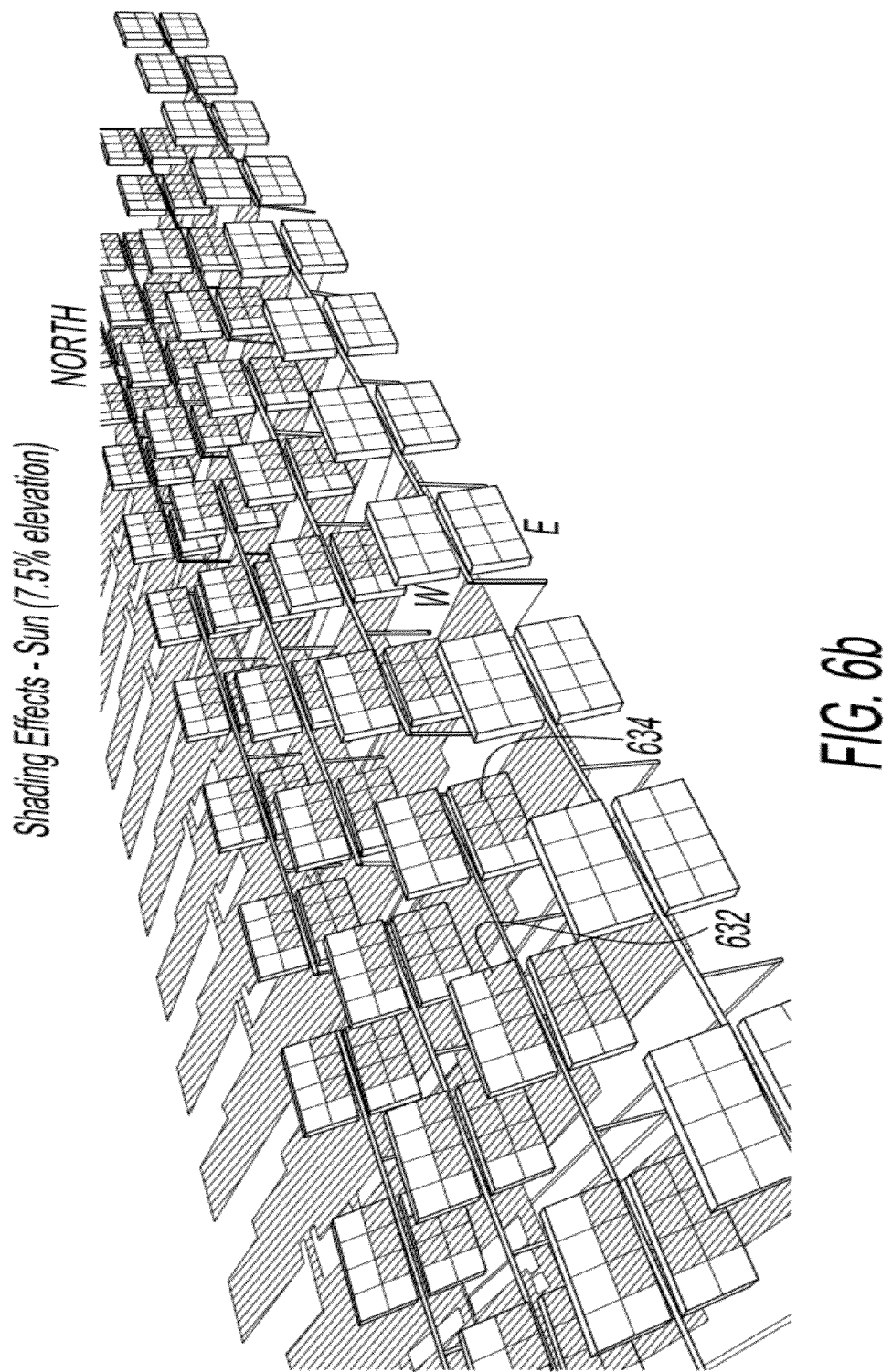
Figure 6C:
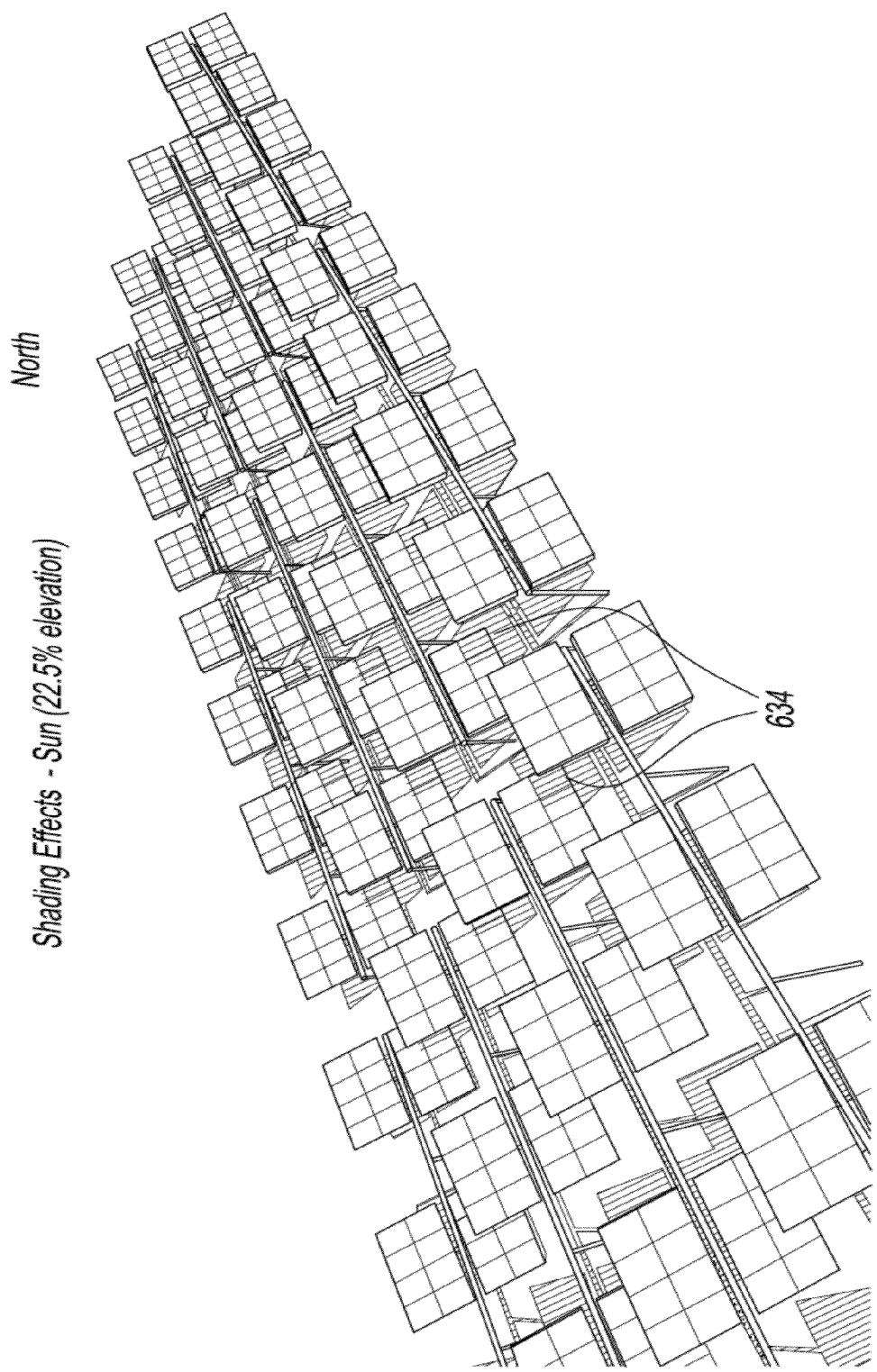
Figure 6D:
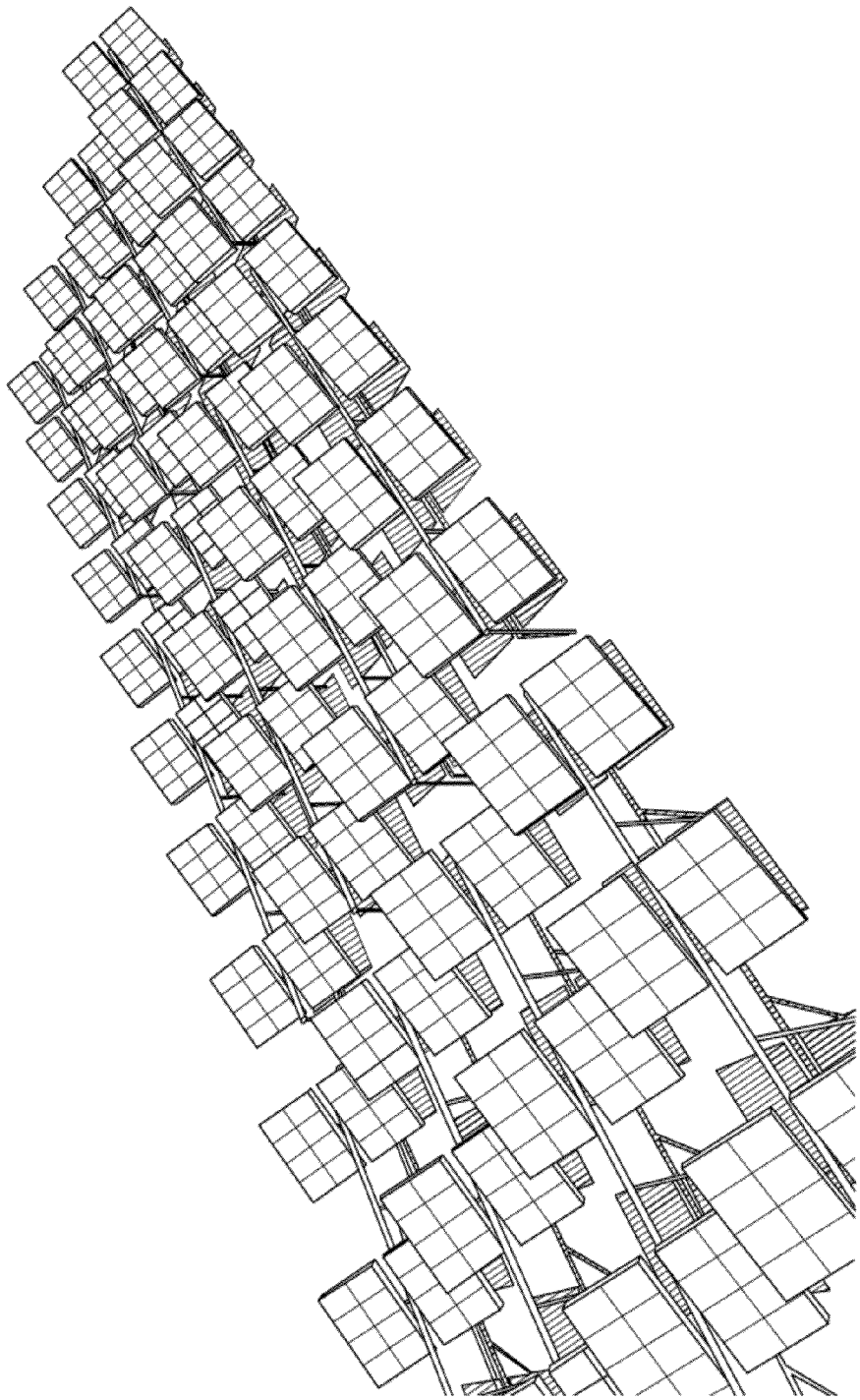
Figure 6H:
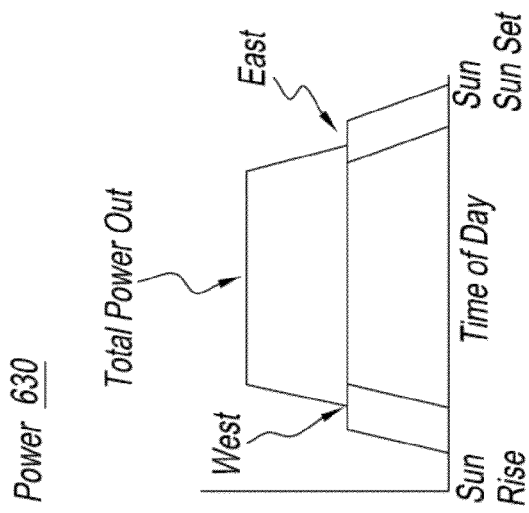
FIG. 6h shows a graph an example power out of each inverter feeding the common AC out throughout the day.

FIG. 6h shows a graph an example power out 630 of each inverter feeding the common AC out throughout the day. The example power out from an inverter corresponds to which side (East or West) set of CPV modules feeds each inverter during the day. The total power out shows that for the majority of the day both sides and thus both inverters significantly contribute to the AC power be generated from that solar array. When the Sun starts shinning as the Sunrises in the day the modules on the West side (current top side) of the solar array receive direct Sunlight prior to the modules on the East side. This is correlation also is shown in FIG. 6h.

The row of PV cells from two or more distinct CPV modules are connected together and feed an inverter circuit. The rows are on the same horizontal plane of a module so they experience roughly the same shading effects from Sun even though they are on two distinct solar arrays. The housing also contains different East and West tracking circuits to compensate for shadowing. This takes account of similar shadowing on an array of PV panels, putting similar panels into strings, having separate inverters for each grouping of such panels, and hence avoiding the need for DC-to-DC booster circuits. If a row of PV cells is being sufficiently shaded, then that inverter being fed by the CPV string of cells is dropped out of power production. See the shading slides 6a-6g to illustrate the horizontal rows of PV cells of distinct solar arrays tied to together to feed an inverter circuit and the shading effects of the Sun throughout the day.

As the angle of the Sun changes or a cloud passes over, generally horizontal rows of CPV modules get shaded. Above as shown in the shading effects at Sunrise in 6a, the solar arrays in the back are being shaded. The solar arrays are physically located close enough/proximate to each other to cause shading effects on a neighboring solar array.

Above as shown in FIG. 6b, the shading effects at a 7.5% sunrise elevation angle, a few horizontal rows of PV modules on the West side in the arrays behind the front line of arrays are being exposed to the direct sunlight and a small portion are being shaded 632. All of the inverters in the front line of arrays put out AC power, while the inverters connected to the string on the lower rows of CPV modules in the arrays on the East side behind the front line might not put out AC power because the majority of the modules 634 are being shaded.

Above as shown in FIG. 6c, the shading effects at a 22.5% Sun elevation angle, only a few CPV modules on the East side 636 are being shaded; and thus, every inverter supplied by these strings should be putting out sufficient power to generate the working level 480 VAC from the inverter.

Figure 6E:
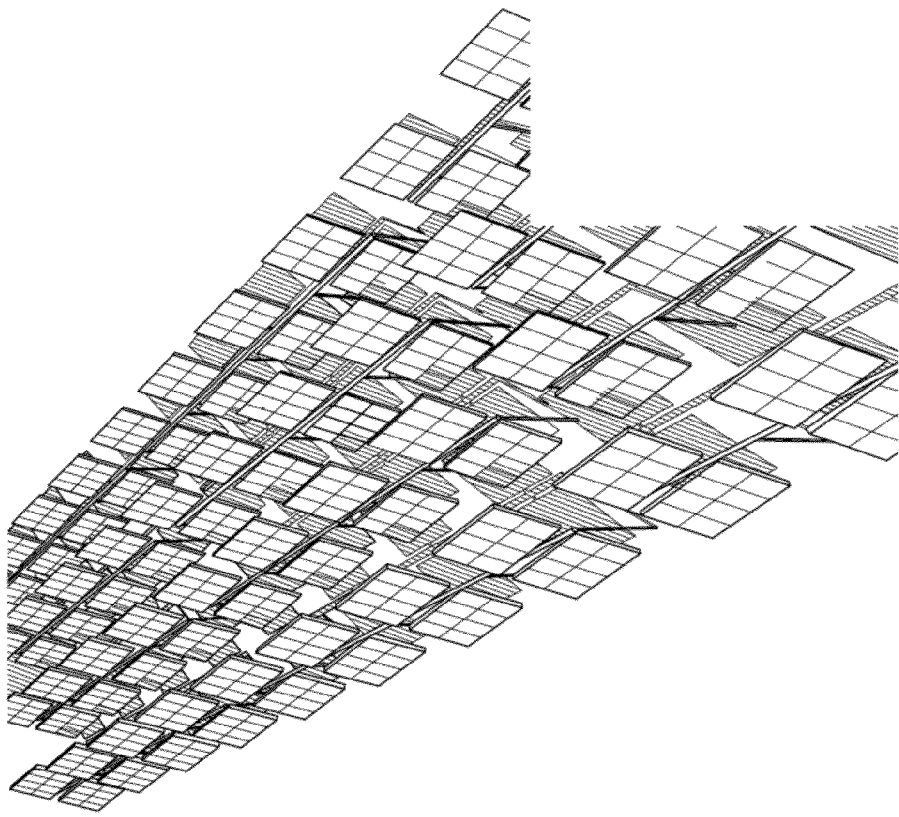
Figure 6F:
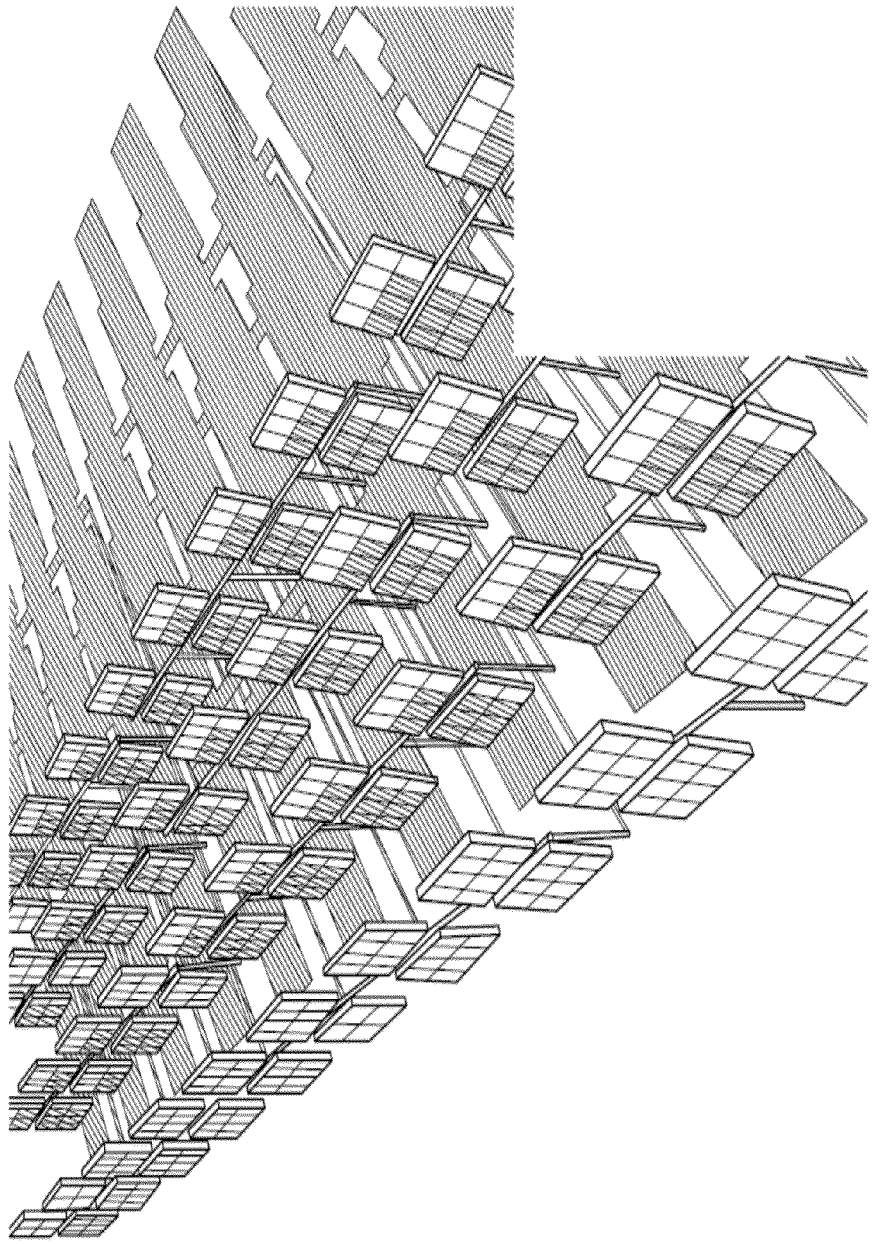
Figure 6G:
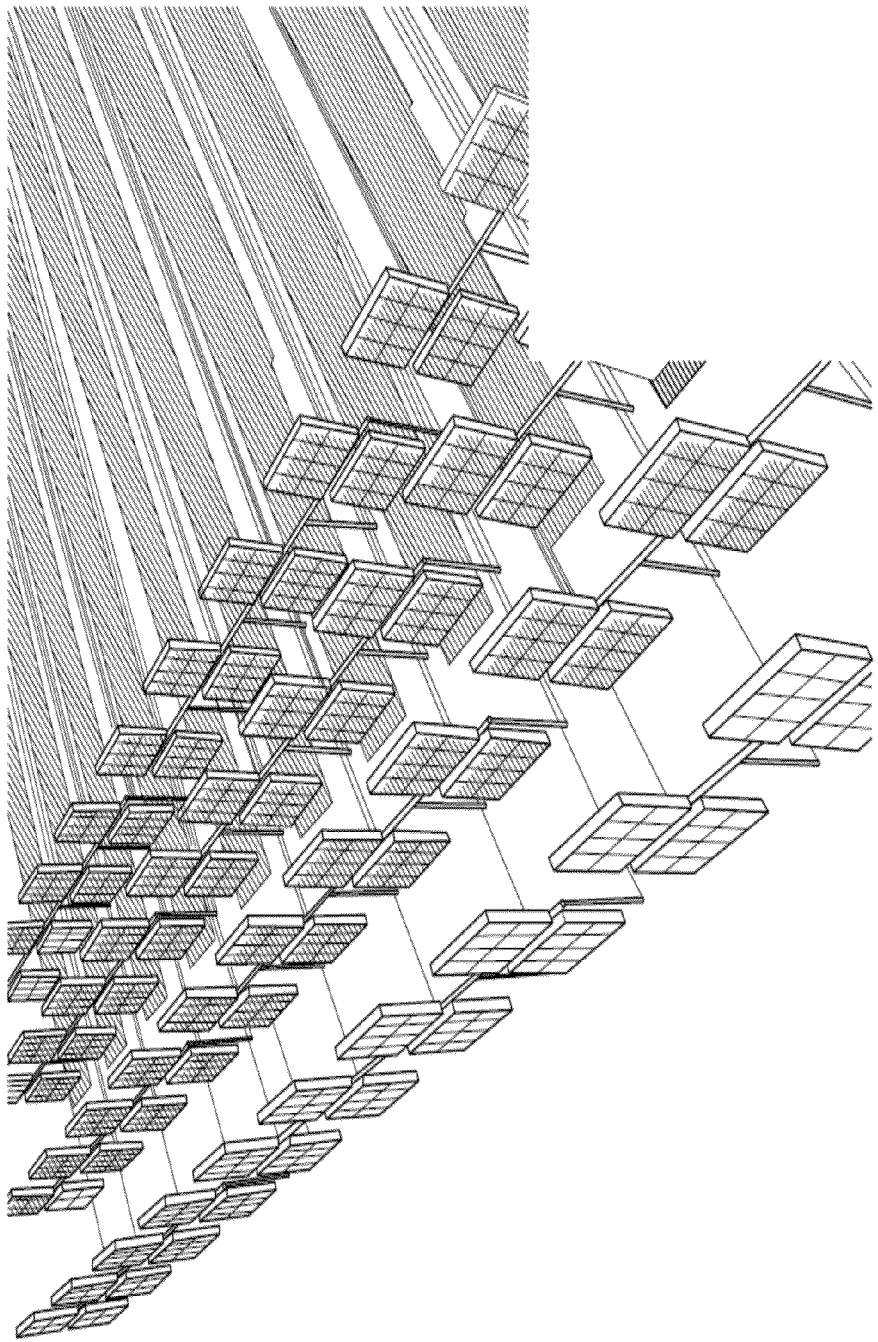

Above as shown in FIG. 6d, the shading effects at a 30% Sun elevation angle, no CPV modules are being shaded; and thus, every inverter supplied by these strings should be putting out sufficient power. As shown FIG. 6e due to the roll of the solar array tracking the Sun throughout the day, the East side is now on the top side of the array. FIGS. 6e-6g show the shading effects on the East side and West side CPV modules reverses due to the Sun moving across the sky. Figure h shows an example power out of each side (East and West) of the set of CPV modules in the solar array during the day. The above idea of takes into account similar shadowing occurs on an array of PV panels, putting those similar horizontally aligned modules/panels into strings of CPV cells, having separate inverters for each grouping of such panels, and hence avoiding the need for DC-to-DC booster circuits.

Figure 5:
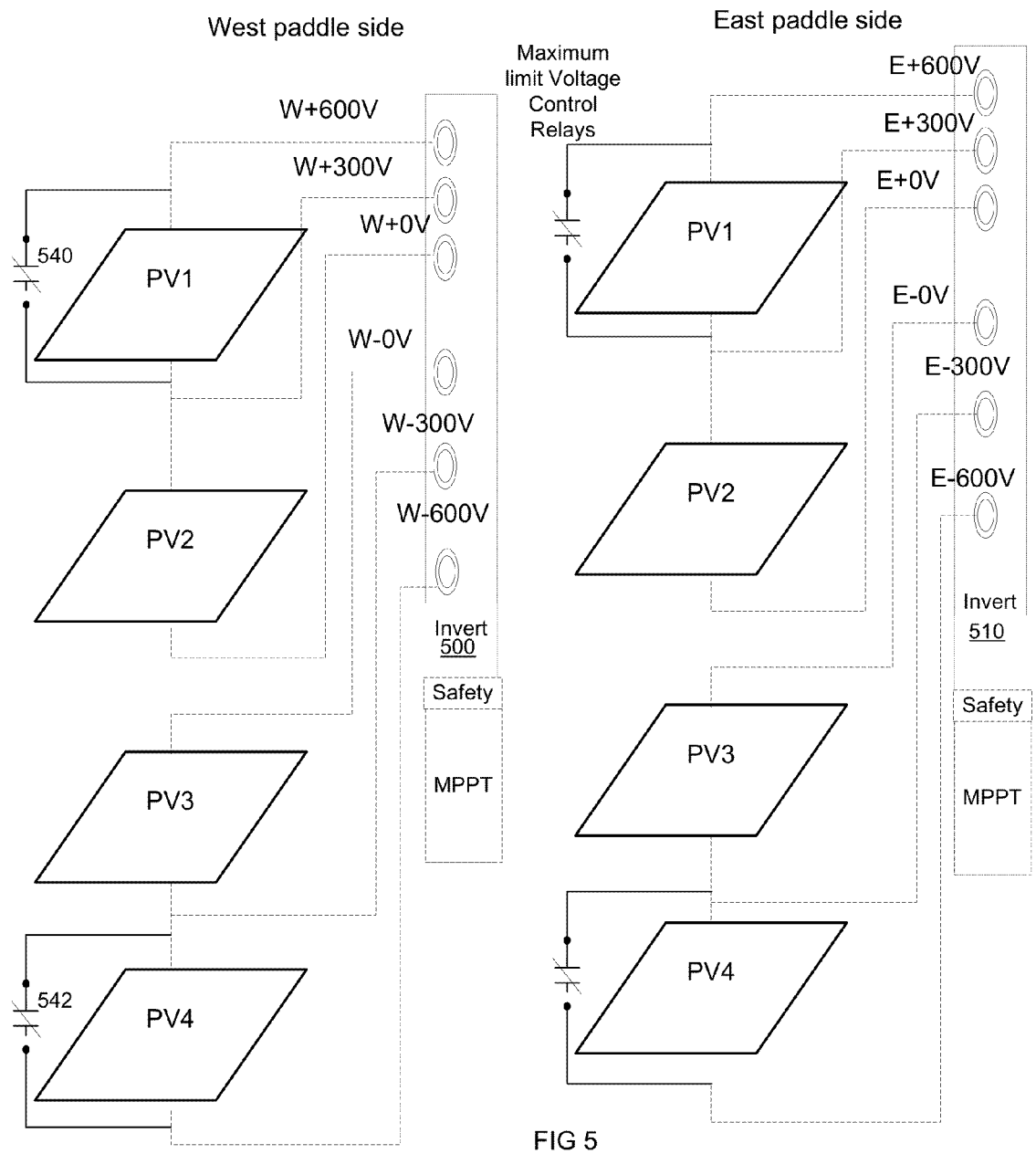
FIG. 5 illustrates a diagram of an embodiment of circuitry and/or an operating methodology with switching devices to stay under 1200 volts DC from being supplied to the inverter circuit.

FIG. 5 illustrates a diagram of an embodiment of circuitry and/or an operating methodology with switching devices to stay under 1200 volts DC from being supplied to the inverter circuit. Two or more of the three-phase AC inverter circuits 500, 510 each couples to its own sets of CPV modules. A safety circuit may include one or more switching devices, such as relays, switches, transistors, and other similar electrical components, and a voltage level detection circuit monitoring the input bipolar DC input voltage level to one or more of the three phase AC inverter circuits.

For a given string, the highest string voltage occurs with the string unloaded (such as when the inverter is off) and the cells are at the coldest temperature extreme (Voc). This is the sum of the individual cell Voltage output for the string. As the cells warm up due to operating, the voltage from that cell drops and becomes steady when a working temperature is achieved (Vmp).

Two or more sets of CPV modules are electrically strung together to supply the bipolar DC input voltage to a particular three phase AC inverter circuit 500, 510. A first switching device in that inverter's safety circuit may actuate, by electrically opening a contact or switch, closing a contact or switch, by the first switching device starting to conduct, and any combination of the three to create an electrically parallel path around one or more of the sets of the CPV modules to effectively bypass that series of CPV modules. For example, the safety circuit does not cause the first normally closed contact 540 to open which effectively bypasses the set of CPV modules in the paddle #1 of the solar array. The safety circuit also does not cause the second normally closed contact 542 to open which effectively bypasses the set of CPV modules in the paddle #4 of the solar array. The voltage level detection circuit in the safety circuit monitors the input bipolar DC input voltage level and sends a signal, which is used to stagger an amount of CPV modules supplying DC voltage level to that inverter. The amount of CPV modules in the two or more sets of CPV modules that at any point in time are supplying DC voltage level to that inverter is controlled by the operation of the one or more switching devices. Less than all of the sets of CPV modules electrically connecting to the particular three phase AC inverter circuit initially contribute to the input bipolar DC voltage supplied to that particular three phase AC inverter circuit 500, 510 to ensure that at all times a maximum DC voltage input into the inverter is below the NEC limit.

As discussed, a string may be a group of Concentrated Photo Voltaic modules electrically connected together across multiple horizontally modules and potentially across two or more paddles located on the same side of the solar array. Any combination of switching devices, such as relays, and operating strategy may be employed which does not let the entire string of photovoltaic cells connect to the inverter for DC to AC conversion until that string of photovoltaic cells, alone or in combination other strings, is at a safe voltage level to connect to the inverter because the DC voltage generated out of each CPV cell can vary with actual temperature of that cell.

The normal practice is to connect enough solar cells in series to the inverter input to make up the required input VDC for power conversion while conforming to the applicable string voltage safety limit. As shown here in FIG. 5, when the inverter is off and the string is consequently unloaded, the end-to-end open-circuit string voltage, Voc, allowed by the switching devices in the safety circuit is to be below the U.S. safety limit. Note, the ground circuit in FIG. 1 will also ground the voltage from the array when the inverter is off. However, when the inverter is turned on, the MPPT sense circuit of the inverter loads the string of CPV cells to its maximum power voltage, Vmp. The DC input voltage is pulled down from Voc (cold) to Vmp when power is being extracted from the solar cell string.

In one approach, 4 paddles with 8 CPV modules each supply voltage into their corresponding inverter 500, 510. The methodology of operating the solar arrays ensures that the input voltage does not go over 1200 VDC by a staggering of the start up of the CPV modules supplying power to that inverter and initially at Voc bypassing a portion of the CPV cells that can contribute to the DC input voltage level. For example, the second and third paddle pair containing their CPV modules in PV2 and PV3 of the solar array may be started up and connected to the two inverters 500, 510. As the PV cells of the paddle pairs receive and start converting the solar radiation into voltage, the operating temperature of those CPV modules will rise and the voltage produced will decrease. Once the second and third paddle pair's output voltage drops below a certain high voltage threshold, then the another paddle pair with another set of CPV modules, the first paddle pair PV1, can be safely un bypassed and connected in series to the same inverter ensuring that at all times the maximum voltage input into the inverter is below the NEC limit of 1200 VDC (US). The maximum permissible string voltage is dictated by safety standards.

As discussed, the switching devices of the safety circuit are used to ensure that once the working temperature has been achieved for the CPV cells in that string, then that string of PV cells can connect to the inverter circuitry 500, 510. In essence, the switching device acts as a voltage clamp circuit to limit the voltage to 1200 total VDC.

In summation, the CPV modules supplying the + and −300 VDC may be started up with the relays contact in the closed state to create a parallel path around the other two electrically connected series CPV modules. The Voc DC input voltage will be below the maximum 1200 VDC. After the CPV modules warm up and their output voltage lowers, then one (or both) of the normally closed contacts of the parallel path will open. This adds another 300 VDC into the inverters. The adding of CPV modules is staggered in stages by the relay operation to ensure the maximum DC input voltage remains below 1200 VDC. The safety circuit in the inverters has a DC input voltage sense circuit to tell the amount of DC voltage being supplied at any given time. The switching devices act as a fail-safe "DC voltage clamp" circuit complying with NEC requirements. The switching devices may use the feedback from the DC sense circuit to determine the contact open and closure.

Note, the maximum permissible string voltage is dictated by safety standards. For US installations, per Underwriters Laboratory (UL) safety compliance requirements, string voltage must be less than +/−600 VDC with respect to ground under all conditions. The corresponding European Union safety limit is +/−1000 VDC. The safety circuit has an adjustable threshold for switching between the different maximum permissible string voltage standards.

Another benefit of staggering the supplied input DC voltage and controlling the amount of DC voltage the inverter components are exposed to is high reliability and long service life. Inverter components may be selected that provide an adequate derating margin between the applied stresses (e.g., 865 VDC) and the manufacturer's specified maximum operating conditions (e.g., 1200 VDC). Typically, a small engineering safety margin is also factored in. Here, if all the stages at cold start up where applied at the same time, components just adequately derated for operation at Vmp would not be adequately derated at the Voc startup stress, requiring the use of more expensive components. By supplying input DC voltage in stages, that keeps the voltage level always below the 1200 VDC and minimizes the expected operating range of voltage supplied into the inverter allowing for derated components.

Example Inverter Circuits

FIG. 7 shows a diagram of an embodiment of a single stage inverter circuit that converts the input DC voltage level directly to the output AC voltage level for high efficiency operation of the concentrating photovoltaic electrical power generation system. The output of the solar cell array is converted to 3-phase AC grid power using the two or more single-stage inverters feeding that common AC output. Each inverter such as the first inverter 700 converts the DC to 3-phase AC grid power feeding that common AC output 706. The benefits are improved efficiency and reliability, and reduced cost and size.

The DC output voltage of enough solar cells in the array is wired in series to produce a DC voltage that is high enough to directly invert to the grid power form (480V 3 phase in the US, 400V 3 phase in the EU). Solid state switching devices such as MOSFETs or IGBTs (insulated gate bipolar transistors), typically in a six-switch bridge or some multiple of that, are rapidly turned on and off by a pulse width modulation (PWM) controller so as to inject the proper amount of current into the grid phases (lines) via current-shaping output filters.

The inverter circuit performs the basic DC voltage to three-phase AC voltage inversion. The inverter stores no cycle-to-cycle energy, so the DC power into the inverter tracks the RMS (root-mean-square) output power. In order to extract the maximum power from the solar cell string, the output current is regulated so as to load the string such that the cells operate at their maximum power voltage, Vmp. The various maximum power point tracking (MPPT) methods used are beyond the scope of this disclosure. However, no matter what the method, the solar cell string must generate sufficient voltage to source current into the grid at maximum grid voltage, typically nominal grid voltage +10%.

Referring to FIG. 4, Frequency and Voltage synchronization signals and wiring exist between the two inverter circuits feeding the common AC output. The controllers for each inverter circuit make sure the two inverter circuits generate the same AC voltage level and at the same frequency, with synchronized phases of AC. Merely the amount of current with that voltage and frequency from each inverter varies.

Figure 8:
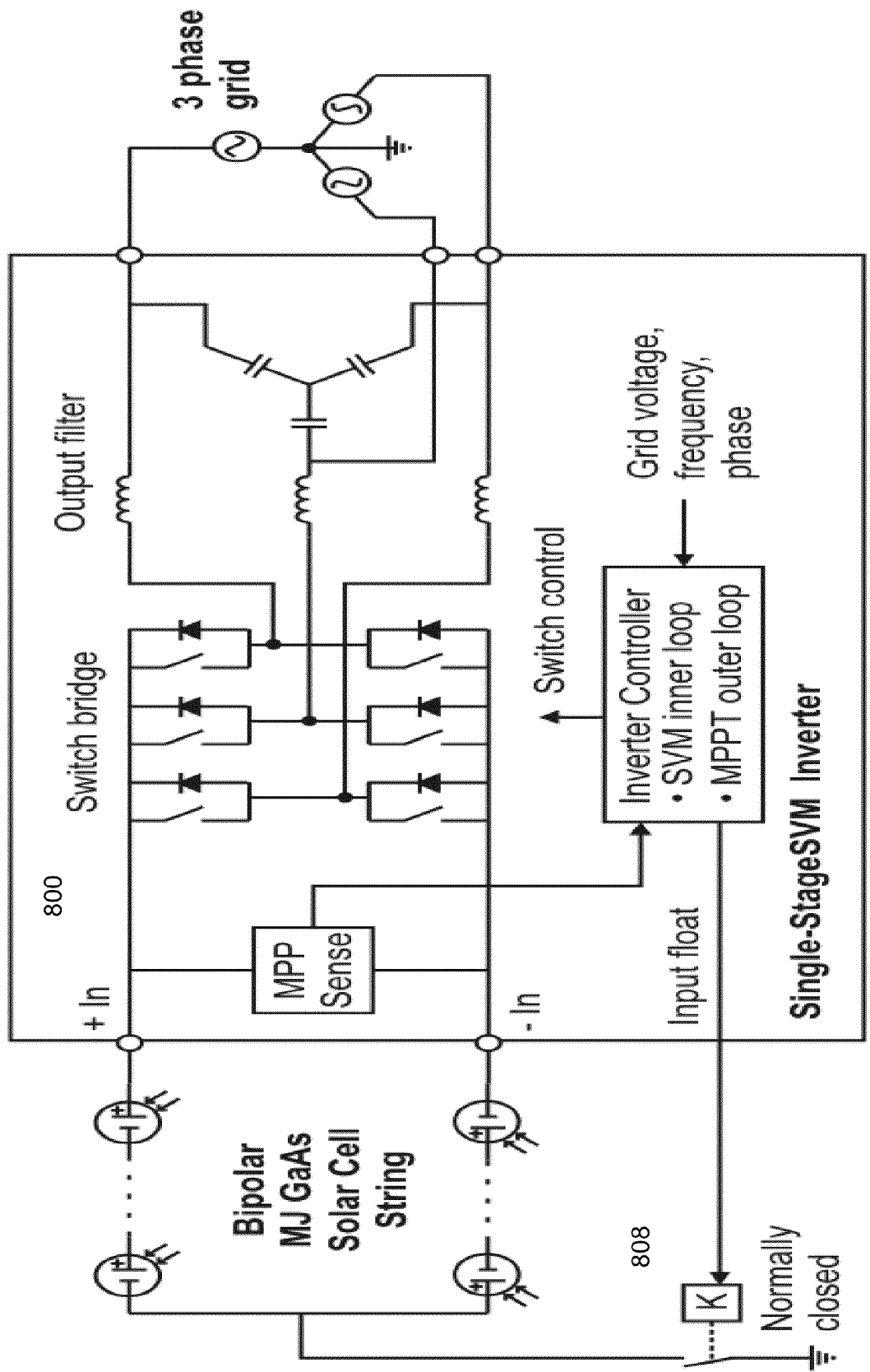
FIGS. 8 and 9 shows more diagrams of example three phase AC inverter circuits.
Figure 9:
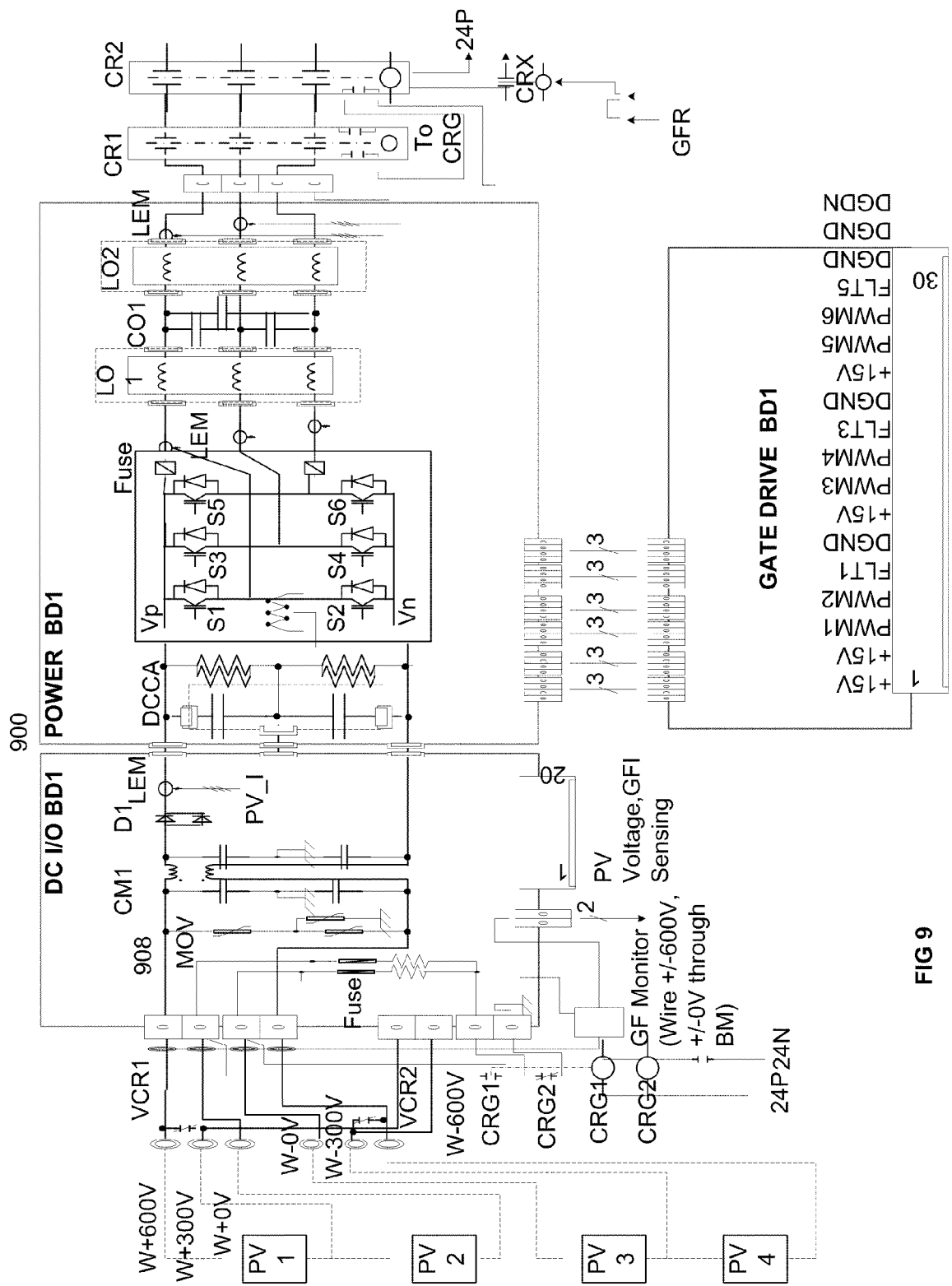

FIGS. 8 and 9 shows more diagrams of example three phase AC inverter circuits. Referring to the figures, the inverter 800, 900 consists of a maximum power point (MPP) sense circuit, a six-switch bridge with associated output filters, a controller circuit, and a DC input grounding circuit 808, 908. Within the Inverter, the transistor switching circuit electrically couples to the combined inverter transistor gate controller and MPP sense circuit, which controls the DC power from the CPV cells of the array. The inverter circuitry 800, 900 is optimized for Multiple Junction cell technology with two strings of CPV cells.

The features of the design may include, but not limited to, the following:

Utilize high fill factor attribute of GaAs triple junction or similar solar cells to enable DC to AC conversion in a single conversion stage.

Employ direct line-to-line voltage synthesis capability enabled by newer power conversion modulation techniques, such as SVM to enable DC to AC conversion at a lower DC input voltage.

Integrate maximum power point tracking mechanism into the single stage DC to AC conversion stage.

Eliminate commonly employed DC/DC boost stage for maintaining a high intermediate voltage bus for synthesizing AC voltage waveforms.

Eliminate a 3-phase 480V isolation transformer for each array; a 480V transformer is not a necessity for isolation purposes since most utilities require the plant to tie into a medium voltage distribution transformer (480 V in, 6.8-13.8 kV out). The common 480 VAC AC output supplied by the two inverters in a solar array may feed the medium voltage distribution transformer. Multiple solar arrays may supply their 480 VAC AC outputs to the medium voltage distribution transformer. (See FIG. 10 for example.)

The inverter controls switching such that the amount of current sourced to the grid loads the solar cell string at its maximum power point (MPP) over conforming grid voltages and also over varying solar cell illumination levels.

The design combines the properties of multi-junction GaAs solar cells and SVM power inversion to provide single-stage inversion to 480 V US grid power while remaining within the US +/−600 Vdc-to-ground safety limit on solar cell string voltage. This combination depends on the high fill factor (ratio of Vmp to Voc) of the cells and reduced input voltage requirement of SVM relative to prior inverters. In avoiding the need to boost the inverter input voltage above that permitted by the string voltage safety limit, the design also allow the use of 1200V-rated inverter components.

The same solar cell-inverter combination can be used for conversion to 400 V EU grid power with greater solar cell failure margin, or with reduced string length to further reduce inverter input voltage rating requirement. The same inverter can be used for EU conversion with silicon solar cells if the inverter input voltage rating is increased enough to withstand the higher Voc (cold) stress.

The multiple junction GaAs solar cell string is configured such that its highest end-to-end voltage (unloaded, cold cells), when the switching devices in the safety circuit 808, 908 bypass none or just a portion of the CPV cells in the string, is not in excess of, 1200 Vdc. For compliance with the +/−600 V-to-ground safety limit, the midpoint of the string is connected to utility ground via a normally closed relay contact while the inverter is off, this creating a +/−600 V bipolar string.

This is a current controlled voltage source inverter via switching voltage across inductor, control algorithm generates sinusoidal 3 phase current signals and a LCL filter removes high frequency switching noise. The controller takes as inputs 1) inverter current feedback, 2) line current feedback, 3) grid voltage feedback, 4) PV string voltage, 5) PV string current. The controller computes IGBT gate signals that control voltage polarity and duration (each switching period) across inductors.

When the inverter turns on, the controller floats the string midpoint and actively manages one sting endpoint voltage with respect to utility ground to maintain compliance with the +/−600 V safety limit. The dual-layer controller implements both Space Vector Modulated control (fast inner layer) and MPPT (slower outer layer). In an embodiment, the controller controls switching such that the amount of current sourced to the grid loads the solar cell string at MPP over conforming grid voltages and also over varying solar cell illumination levels. When the power available from the solar cells falls below a specified minimum, the inverter re-grounds the string midpoint, turns off the power path, and monitors the string for the resumption of adequate power.

This design reduces power conversion equipment cost, improves efficiency, improves reliability through reduced parts count, and other import advantages. This design also reduces system or plant wiring cost by reducing a number of home runs in a system and increases wiring efficiency by increasing the effective system operation voltage.

Note, the solar cells are multi-junction solar cells, which range of output voltage is higher than silicon based cells and which range of output voltage varies less with temperature differences than silicon based photovoltaic cells. Each string of CPV cells electrically connecting to its inverter circuit has its own MPPT sense circuit to maximize the power coming out of that string. Each MPPT has an operating window of output voltages from a string of CPV cells into the inverter of up to 600 VDC whereas most other MPPT sense circuits are limited to 480 VDC. The temperature operating range is from −25 C to +55 C, a full output power 16 KW at three phase 480 VAC, and full DC input voltage range of 700 VDC to 1200 VDC to direct convert to the 480 VAC.

In an embodiment, Maximum Power and Open Circuit Voltages including Voc and Vmp may be determined as follows. For a given Voc (cold), the worst-case (lowest) operating voltage, assuming proper MPPT and no defective cells, is the sum of individual cell Vmp's at the hottest operating temperature extreme, which we denote as Vmp (hot). To find Vmp (hot), we must apply both voltage temperature derating and fill factor (ratio of Vmp to Voc) corrections.

Table 1 works out Vmp (hot) for both silicon and multi-junction GaAs cells strings at the US and EU safety limits. These values are largely independent of illumination level. To obtain maximum string voltages consistent with the safety limits, the string is typically grounded at its midpoint, with the ends of the bipolar string connected to the inverter. Hence the "Vmp (hot) from two strings" entries as shown in the table.

TABLE 1

Solar cell string voltage chart

| | | Location | | | |
|---|---|---|---|---|---|
| | Units | US | US | EU | EU |
| String Voc safety limit = Voc (cold) | Vdc | 600 | 600 | 1000 | 1000 |
| Solar cell type | | Si | MJ GaAs | Si | MJ GaAs |
| Voltage coeff. of temp. | Percent | −0.35 | −0.125 | −0.35 | −0.125 |
| Operating temp. range | Deg C. | 100 | 80 | 100 | 80 |
| Voc derating over temp. range. | Percent | −35 | −10 | −35 | −10 |
| Voc derating over temp. range. | Vdc | −210 | −60 | −350 | −100 |
| Voc (hot) | Vdc | 390 | 540 | 650 | 900 |
| Ratio of Vmp to Voc | | 0.76 | 0.8375 | 0.76 | 0.8375 |
| Vmp (hot) | Vdc | 296 | 452 | 494 | 754 |
| Vmp (hot) from two strings | Vdc | 593 | 905 | 988 | 1508 |

The minimum voltage required to operate an inverter depends on the grid voltage and the inverter control method. Sine-triangle PWM is the simpler and historically prevalent PWM control method. A newer, more sophisticated method is space vector modulation (SVM). SVM requires approximately 15% less input voltage to operate into a given grid voltage.

The below table consolidates the required voltage data for SVM, reckoning sine-triangle PWM input requirements as the calculated SVM requirements plus 15%.

TABLE 2

Consolidated input voltage data (all values Vdc)

| | Location | | | |
|---|---|---|---|---|
| | US | US | EU | EU |
| | Solar cell type | | | |
| | Si | MJ GaAs | Si | MJ GaAs |
| Vmp (hot) from bipolar string conforming to Voc safety limit | 593 | 905 | 988 | 1508 |
| Sine-triangle PWM into high grid | | | | |
| Minimum input voltage required | 896 | 896 | 750 | 750 |
| Single-stage inversion possible? | No | Marginal | Yes | Yes |
| SVM inverter into high grid | | | | |
| Minimum input voltage required | 779 | 779 | 652 | 652 |
| Single-stage inversion possible? | No | Yes | Yes | Yes |
| Maximum input voltage stress = Bipolar string Voc (cold) | 1200 | 1200 | 2000 | 2000 |

This data shows that single-stage sine-triangle conversion to US grid power is reasonably not feasible when using silicon solar cells and has a margin of 9V when using MJ GaAs cells. The failure of only several GaAs cells could erase this margin. However, the single stage SVM inverter with multiple junction cells is feasible especially when combined with the staggering of adding in additional sets of CPV cells by the safety circuit as the modules warm up.

Referring to FIG. 5, the three phase AC inverter circuits 500, 510 are each contained in their own sub assembly with connections that are easily coupled to or slid into the electrical connections making replacement, troubleshooting, and servicing easier. With the field replaceable inverter subassemblies, each inverter subassembly has a single housing with connections that are easily coupled to or slid into the electrical connections within the integrated electronics housing.

FIGS. 4, 8, and 9 show the three-phase AC inverter circuitry has a pulse modulated switching circuit that generates a continuous three-phase power that avoids any need for a large capacitance value electrolytic capacitors and uses film based capacitors instead due to an overall lower need for capacitance in the inverter circuitry.

The three phase power unit avoids the need for large electrolytic capacitors when switching to produce a single phase AC power. The three phase power unit eliminates the electrolytic capacitor in the DC link of the inverter. As discussed, this CPV system consists of a PV generator for conversion of solar irradiation into DC electricity, and an inverter for converting direct current into alternating current. For each single phase of the AC generated in the inverter circuit, a buffering storage (generally an electrolyte capacitor) is necessary. If the buffering storage capacitor is connected in parallel with the PV array, its capacitance has to be large enough to keep the voltage ripple resulting from oscillating capacitor current small enough, thus keeping the PV array's operating voltage close enough to its operating point. However, due to continuous power flow of three-phase AC, an electrolyte capacitor as buffering storage can be avoided, and the sizing of components can be considerably reduced (i.e. peak load on input stage semiconductors, inductance and transformer are reduced).

Referring back to FIG. 2, the module's wiring has an inter-receiver connector approach performed in the manufacturing facility itself. Elimination of individually wiring each of the hundreds of thousands of solar cells, such as the first CPV cell 253 through the Nth CPV cell 255, in the solar generation facility during the field installation occurs. Wiring is installed and connections are made between the CPV cells in each CPV module in the manufacturing facility itself, which eliminates individually wiring each of the fifteen hundred CPV solar cells in each solar array during the field installation. The solar cells in each module are wired in the series-parallel arrangement as shown in FIG. 4 (above).

Note, a plurality of CPV solar cells are contained and electrically connected in series within each CPV module. A bypass diode exist on each individual CPV solar cell, such as a first bypass diode 259, so when that cell is being shaded or fails, the electrically series connected cell in that PV string does not act as a load to significantly knock down the DC voltage output from that CPV module. The voltage out of that series of cells will be roughly the sum of the voltage coming out of each cell minus any electrical resistance/loads in that series of cells and the bypass diode allows a cell that is not putting out enough voltage to be bypassed rather than knock down the voltage output even more. The dominant cell failure mode is fail-open, so that the voltage across a failed cell bypassed by a Schottky diode changes from a ~2.7 V contribution to a ~0.2 to 0.4 V drop, for a ~3 V reduction in string voltage for each failed cell.

Figure 10:
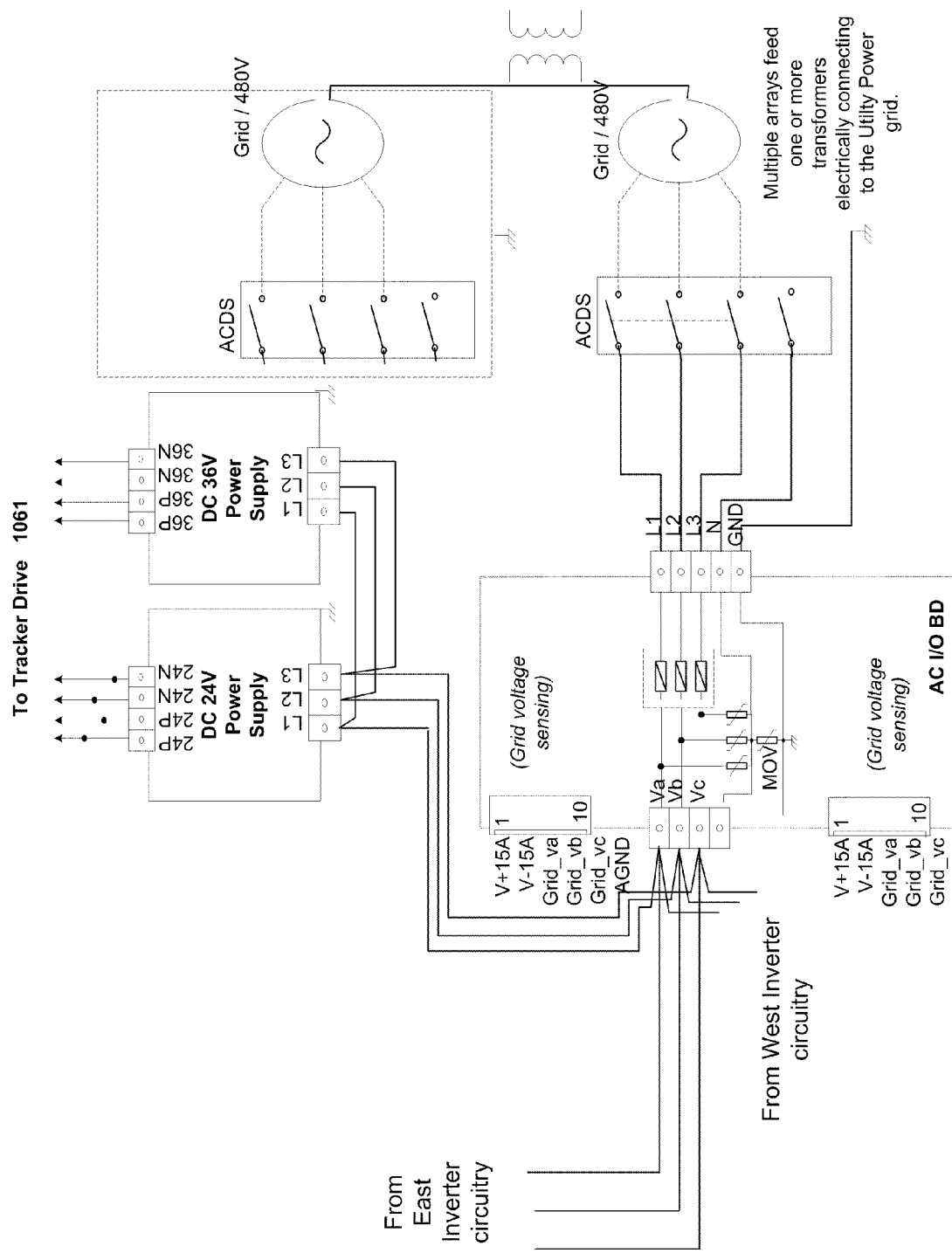
FIG. 10 illustrates a diagram of an embodiment of the feedback circuitry for use between the MPPT sense circuitry in the inverter and the solar tracking calibration algorithm for the solar array.

FIG. 10 illustrates a diagram of an embodiment of the feedback circuitry for use between the MPPT sense circuitry in the inverter and the solar tracking calibration algorithm for the solar array. When a calibration tracking algorithm repositions the roll and potentially tilt axis of the paddles containing the CPV cells for calibrating to achieve the maximum power out of the entire solar array, then the feedback loop occurs between the MPPT sense circuitry and the algorithm determining maximum power. The algorithm will send a command to alter the angle of each paddle with respect to the Sun in a set of positions (two or more slightly different positions). After each movement of the paddles containing the CPV cells, then a signal is sent to the MPPT sense circuit for each string of CPV cells supplying power from that solar array to reestablish the Maximum Power Point for that particular string. When the MPPT sense circuits for all of the strings supplying power to those two inverters report back that they have completed their MPPT functionality to establish the Maximum Power Point for that particular string, then a signal is sent to the calibration algorithm to go ahead and determine the I-V curve and power coming out of this solar array for that coordinate position. This feedback loop circuitry between the tracker control circuit moving the paddles containing the CPV cells and the MPPT sense circuit in the inverter establishing the maximum power point for each string of CPV cells supplying power DC power to the inverter occurs for each calibration coordinate.

Note, the CPV solar cells connected to a given inverter are housed in one or more photovoltaic modules, which in the case of this concentrated photovoltaic system are kept oriented to the Sun by a two-axis tracker. The current vs. voltage, and hence power, characteristics of a solar cell array are affected by a wide range of factors, including:

Module manufacturing variations, including solar cell grading, and cell-to-optics and optics-to-housing alignment and stability;

Tracker accuracy at installation;

Module-to-tracker alignment at installation;

Tracker structural deformation due to ground settling over plant service life;

Module deflection by wind;

Temperature/temperature gradient-dependent effects on optical and structural alignments, and solar cell efficiency;

Optical degradation due dust, debris, and/or moisture;

Degradation of electrical interfaces; and

Solar cell failures (diodes bypass fail-open cells).

The CPV modules contributing to the array are brought into the desired orientation (assume normal tracking). The inverter is turned on and operated at Vmp long enough to stabilize the solar cells at their normal operating temperature for the given conditions (cell temperatures are higher with the inverter off since no electrical power is being extracted). A tracking algorithm can be used to assess the pointing accuracy of the various modules in a tracker unit. The tracker is installed with its common roll axis oriented N-S. Each small increment of the Sun's motion is approximately in the roll direction. To characterize the roll pointing accuracy of the various modules, the tracker is aimed at a point on the solar trajectory. As the Sun transits the tracker aiming point, the tracking algorithm loads and samples each string.

An alternate embodiments of the design could have a single centralized inverters that handle multiple photovoltaic strings could employ a combination of the following stages (one of the optional units is required at a minimum): a DC/DC boost power conversion stage (optional), a DC/AC inverter as disclosed above (required), a step-up transformer (optional).

Although the foregoing embodiments have been described in some detail for purposes of clarity of understanding, the invention is not limited to the details provided. Solar array may be organized into one or more paddle pairs. CPV modules on the West side may be started up before the modules on the East side. Functionality of circuit blocks may be implemented in hardware logic, active components including capacitors and inductors, resistors, and other similar electrical components. There are many alternative ways of implementing the invention. The disclosed embodiments are illustrative and not restrictive.

We claim:

1. An inverter apparatus for converting power from a bipolar photovoltaic source to 3-phase AC power, comprising:

a bipolar DC input port, a DC capacitive energy storage element, a single-stage DC to 3-phase power converter, AC line isolation contactors, a 3-phase AC output port and a control circuit;

wherein the bipolar DC input port is configured to accept two monopolar photovoltaic source circuits, where a first conductor of each of said monopolar photovoltaic source circuits is coupled to earth ground and where a second conductor of each of said monopolar photovoltaic source circuits are collectively of opposite polarities and coupled across a DC capacitive energy storage bus;

wherein the DC capacitive energy storage element further comprises film type capacitors;

wherein the DC capacitive energy storage element is coupled to an input of the single-stage DC to 3-phase power converter;

wherein the AC line isolation contactors are configured to make or break a coupling between an output of the single-stage DC to 3-phase power converter and the 3-phase AC output port under control of the control circuit; and wherein the 3-phase AC output port is connected to an electrical utility grid.

2. The inverter apparatus for converting power from a bipolar photovoltaic source to 3-phase AC power of claim 1, further comprising:

a first inverter circuit of a plurality of three-phase AC inverter circuits; and a second inverter circuit, where a first string of PhotoVoltaic (PV) cells all from the East side of a solar array feeds the first inverter circuit, and a second string of PV cells all from the West side of the solar array feeds the second inverter circuit, and this grouping of similarly shaded modules into the same string of PV cells feeding a particular inverter tends to allow a more narrow input working voltage into that three-phase AC inverter circuit, which avoids a DC-to-DC boost stage requirement between an input DC voltage circuit portion and an AC conversion portion in that three-phase AC inverter circuit.

3. The inverter apparatus for converting power from a bipolar photovoltaic source to 3-phase AC power of claim 1, further comprising:

a single stage DC-to-AC voltage conversion circuitry containing a plurality of three phase AC inverter circuits electrically connecting into a common three-phase AC output, where the three-phase AC inverter circuitry has no need for supplemental input DC voltage level boosting strategies, including a DC input boost stage to increase the DC input voltage level to a higher DC voltage level for the DC to AC conversion, because the supplied bipolar DC input voltage level from the set of PV modules is high enough to directly convert to an AC working voltage level, and provides a three-phase 480 VAC output voltage level from the inverter circuit without the DC input boost stage or a step up transformer after the inverter portion.

4. The inverter apparatus for converting power from a bipolar photovoltaic source to 3-phase AC power of claim 1, further comprising:

a first solar array with PV cells on the East side and the West side of the solar array contained in the PV modules supplying the bipolar DC voltage to a plurality of three-phase AC inverters, and these two or more three-phase AC inverters per this single solar array account for voltage differences coming out of the set of PV modules on the East side of the solar array and the voltage coming out of the set of PV modules on the West side of the solar array, which allows a first three phase AC inverter connected to the set of PV modules on the East side to operate at the bipolar DC input voltage level coming from the East side independent of what bipolar DC input voltage level is being produced and supplied by the set of PV modules on the West side to a second three phase AC inverter, and vice versa.

5. The inverter apparatus for converting power from a bipolar photovoltaic source to 3-phase AC power of claim 1, further comprising:

a plurality of PV cells are contained and connected electrically in series in each module in the set of PV modules and enough are connected electrically in series in a string of PV cells from the set of modules to allow the bipolar DC voltage level from the PV modules to allow the bipolar DC input voltage level from the PV string of cells to be high enough to directly convert the DC voltage to the working AC voltage level but lower than a maximum DC voltage limit set by the National Electric Code (NEC).

6. The inverter apparatus for converting power from a bipolar photovoltaic source to 3-phase AC power of claim 5, further comprising:

an input DC grounding circuit located in each inverter circuit that electrically couples to the strings of PV cells from a solar array, where the electrical components in an input DC Grounding Circuit cause the DC power from the strings of PV cells to be connected to ground when the inverter circuit is not producing three phase AC power out and the electrical components in the input DC Grounding circuit also use 1) a contact 2) switch or 3) both to create a dynamic ground/common zero VDC reference point for the bipolar DC voltage supplied to that inverter from its set of PV modules.

7. The inverter apparatus for converting power from a bipolar photovoltaic source to 3-phase AC power of claim 5, further comprising:

a voltage level detection circuit monitoring the input bipolar DC input voltage level to one or more three phase AC inverter circuits;

one or more switching devices; and where two or more sets of PV modules are electrically strung together to supply bipolar DC input voltage to a particular three phase AC inverter circuit, where a first switching device may actuate, by electrically opening a contact or switch, closing a contact or switch, by the first switching device starting to conduct, and any combination of the three, to create an electrically parallel path around one or more of the sets of the PV modules to effectively bypass that series of PV modules for that inverter, and by the voltage level detection circuit monitoring the input bipolar DC input voltage level, a staggering of an amount of PV modules supplying bipolar DC voltage level to that inverter is controlled by the operation of the one or more switching devices, where less than all of the sets of PV modules electrically connecting to the particular three phase AC inverter circuit initially contribute to the input bipolar DC voltage supplied to that particular three phase AC inverter circuit to ensure that at all times a maximum DC voltage input level into the inverter is below the NEC limit.

8. The inverter apparatus for converting power from a bipolar photovoltaic source to 3-phase AC power of claim 1, where a plurality of three phase AC inverter circuits are each contained in their own sub assembly with connections that are easily coupled to or slid into the electrical connections making replacement, troubleshooting, and servicing easier, and where a single solar array containing sets of PV modules that supply the DC power to the plurality of inverter circuits.

9. The inverter apparatus for converting power from a bipolar photovoltaic source to 3-phase AC power of claim 5, wherein wiring is installed and connections are made between the PV cells in each PV module in the manufacturing facility itself, which eliminates individually wiring each of the hundreds of PV cells in each solar array during the field installation of the solar array, where the PV cells in each module are wired in an electrically series-parallel arrangement.

10. The inverter apparatus for converting power from a bipolar photovoltaic source to 3-phase AC power of claim 1, further comprising:
- a plurality of PV cells contained and connected electrically in series in each module in a set of PV modules; and
- a bypass diode on each individual PV cell and electrically in parallel with that individual PV cell so when that cell is being shaded or fails, the electrically series connected PV cell in that PV string does not act as a load to significantly knock down the DC voltage output from that PV module.

11. The inverter apparatus for converting power from a bipolar photovoltaic source to 3-phase AC power of claim 1, further comprising:
- a plurality of PV cells contained and connected electrically in series in a set of PV modules to form a string of PV cells, where multiple strings of PV cells are formed and organized coming from a solar array to a plurality of three-phase AC inverter circuits; and
- a multiplicity of Maximum Power Point Tracking sense circuits controlling the PV cells in the solar array, each Maximum Power Point Tracking sense circuit controlling the DC power associated with its own string of PV cells that are configured to operate over a wide temperature range from −25 degrees C. to +55 degrees C., with a DC voltage operating window of 450 VDC up to 600 VDC to maximize the power coming out of that string, and where the PV cells are multi-junction solar cells.

12. The inverter apparatus for converting power from a bipolar photovoltaic source to 3-phase AC power of claim 1, further comprising:
- a controller to control the gating of a space vector modulated bridge switching circuit in a first inverter of a plurality of three phase AC inverter circuits; and
- Frequency and Voltage synchronization signals and wiring between the plurality of three phase AC inverter circuits feeding the common AC output to make sure the multiple inverter circuits generate the same AC voltage level and at the same frequency, and with synchronized phases of AC.

13. The inverter apparatus for converting power from a bipolar photovoltaic source to 3-phase AC power of claim 1, further comprising:
- a plurality of PV cells contained and connected electrically in series in a set of PV modules to form two or more strings of PV cells, where each string of PV cells is controlled by its own Maximum Power Point Tracking (MPPT) sense circuit in a three phase AC inverter circuit; and
- feedback circuitry in the inverter circuitry configured for use between the MPPT sense circuitry in the inverter and a solar tracking calibration algorithm for a solar array, where after each movement of the solar array for each calibration point, then a signal is sent to the MPPT sense circuit for each string of PV cells supplying power from that solar array to reestablish the Maximum Power Point for that particular string, and when the MPPT sense circuits for all of the strings supplying power to those multiple inverters report back that they have completed their MPPT functionality to establish the Maximum Power Point for that particular string, then a signal is sent to the solar tracking calibration algorithm to determine the power coming out of the solar array for that coordinate position.

14. The inverter apparatus for converting power from a bipolar photovoltaic source to 3-phase AC power of claim 1, wherein two or more of a plurality of three phase AC inverter circuits have a pulse modulated switching circuit that generates a continuous three-phase power that avoids any need for large capacitance value electrolytic capacitors and uses film based capacitors instead due to an overall lower need for capacitance in the three phase AC inverter circuitry.

15. The inverter apparatus for converting power from a bipolar photovoltaic source to 3-phase AC power of claim 1, further comprising:
- a solar array with PV cells on the East side and the West side of the solar array contained in the PV modules supplying bipolar DC voltage to a plurality of three-phase AC inverters; and
- one or more Maximum Power Point Tracking (MPPT) sense circuits associated with each three phase AC inverter circuit, where each inverter has its own MPPT sense circuit per string of PV cells electrically coupling to that inverter to maximize the DC power coming from the string of PV cells contained in the PV modules, where a first MPPT sense circuit maximizes the DC power coming from a first string of PV cells located exclusively on the East side of the solar array, and a second MPPT sense circuit maximizes the DC power coming from a second string of PV cells located exclusively on the West side of the solar array.

16. The inverter apparatus for converting power from a bipolar photovoltaic source to 3-phase AC power according to claim 1, further comprising: a DC grounding circuit configured to allow for uncoupling said first conductor of each of said monopolar photovoltaic source circuits from earth ground when the inverter apparatus is producing power.

17. The inverter apparatus for converting power from a bipolar photovoltaic source to 3-phase AC power according to claim 1, further comprising: a second set of AC line isolation contactors connected in series with the AC line isolation contactors to provide isolation redundancy.

18. The inverter apparatus for converting power from a bipolar photovoltaic source to 3-phase AC power according to claim 1, further comprising: a DC ground fault detector and interrupter.

19. The inverter apparatus for converting power from a bipolar photovoltaic source to 3-phase AC power according to claim 1, further comprising: a diode between the bipolar DC input port and the DC capacitive energy storage element configured to allow preventing reverse current flow at the bipolar DC input port.

* * * * *